(12) United States Patent
Tsuge et al.

(10) Patent No.: US 7,870,094 B2
(45) Date of Patent: Jan. 11, 2011

(54) METHOD AND SYSTEM FOR CONTINUOUS DATA PROTECTION

(75) Inventors: Yoichiro Tsuge, Kawasaki (JP); Nobuo Beniyama, Yokohama (JP); Takuya Okamoto, Machida (JP)

(73) Assignee: Hitachi, Ltd., Tokyo (JP)

( * ) Notice: Subject to any disclaimer, the term of this patent is extended or adjusted under 35 U.S.C. 154(b) by 426 days.

(21) Appl. No.: 12/003,997

(22) Filed: Jan. 4, 2008

(65) Prior Publication Data

US 2008/0208932 A1 Aug. 28, 2008

(30) Foreign Application Priority Data

Feb. 22, 2007 (JP) ............... 2007-042347

(51) Int. Cl.
*G06F 17/13* (2006.01)
(52) U.S. Cl. ..................... 707/611; 707/690
(58) Field of Classification Search .............. 707/690, 707/611
See application file for complete search history.

(56) References Cited

U.S. PATENT DOCUMENTS

| | | | |
|---|---|---|---|
| 6,473,775 B1 * | 10/2002 | Kusters et al. ............... 1/1 |
| 7,111,136 B2 * | 9/2006 | Yamagami ................ 711/162 |
| 7,162,601 B2 | 1/2007 | Yamagami |
| 2003/0079019 A1 * | 4/2003 | Lolayekar et al. ........... 709/226 |
| 2005/0108565 A1 * | 5/2005 | Blea et al. ................... 713/200 |
| 2006/0095696 A1 | 5/2006 | Amano et al. |

* cited by examiner

*Primary Examiner*—John E Breene
*Assistant Examiner*—Dennis Myint
(74) *Attorney, Agent, or Firm*—Foley & Lardner LLP

(57) ABSTRACT

In operation of continuous data protection, a continuous data protection method enables the user to easily select a copy data storage volume and an update request storage volume. A storage management server calculates selection conditions of candidates for a copy data storage volume and an update request storage volume based on a continuous data protection period to continuously protect a protection target volume and a disk capacity and an update access characteristic of the protection target volume to thereby select, according to the selection conditions, the candidates for the copy data and update request storage volumes. At occurrence of abnormality in data of the protection target volume, the continuous data protection system can restore data to a particular position (point of time) within the continuous data protection period.

8 Claims, 21 Drawing Sheets

| CONTINUOUS DATA PROTECTION MANAGEMENT INFORMATION ||||| 
|---|---|---|---|---|
| LOGICAL ID | STORAGE SYSTEM ID | CONTINUOUS DATA PROTECTION PERIOD (SECONDS) | COPY DATA STORAGE VOLUME LOGICAL ID | UPDATE REQUEST STORAGE VOLUME LOGICAL ID |
| 2 | 2000 | 86400 | 21 | 22 |

FIG.5

VOLUME SELECTION CONDITION 7300

| LOGICAL ID | STORAGE SYSTEM ID | CONTINUOUS DATA PROTECTION PERIOD (SECONDS) | COPY DATA STORAGE VOLUME DISK CAPACITY (MB) | COPY DATA STORAGE VOLUME UPDATE ACCESS CHARACTERISTIC (MBps) | COPY DATA STORAGE VOLUME DISK CAPACITY (MB) | COPY DATA STORAGE VOLUME UPDATE ACCESS CHARACTERISTIC (MBps) |
|---|---|---|---|---|---|---|
| 1 | 2000 | 3600 | 100000 | 100 | 360000 | 100 |

| VOLUME MANAGEMENT INFORMATION | | | | |
|---|---|---|---|---|
| LOGICAL ID | STORAGE SYSTEM ID | DISK CAPACITY (MB) | UPDATE ACCESS CHARACTERISTIC (MBps) | USE STATE |
| 1 | 2000 | 100000 | 100 | IN USE |
| 2 | 2000 | 100000 | 100 | IN USE |
| 3 | 2000 | 100000 | 200 | IN USE |
| 21 | 2000 | 100000 | 100 | IN USE |
| 22 | 2000 | 500000 | 100 | IN USE |
| 110 | 2000 | 100000 | 200 | UNUSED |
| 111 | 2000 | 100000 | 100 | UNUSED |
| 112 | 2000 | 100000 | 50 | UNUSED |
| 121 | 2000 | 500000 | 200 | UNUSED |
| 122 | 2000 | 500000 | 100 | UNUSED |
| 123 | 2000 | 10000 | 200 | UNUSED |
| 211 | 2000 | 100000 | 20 | UNUSED |
| 212 | 2000 | 100000 | 10 | UNUSED |
| 213 | 2000 | 100000 | 5 | UNUSED |
| 214 | 2000 | 100000 | 2 | UNUSED |
| 221 | 2000 | 100000 | 100 | UNUSED |
| 222 | 2000 | 100000 | 70 | UNUSED |
| 223 | 2000 | 50000 | 100 | UNUSED |
| 224 | 2000 | 30000 | 70 | UNUSED |

FIG.8

CANDIDATE VOLUME SELECTION CONDITION CONFIRMATION SCREEN 8200

CONTINUOUS DATA PROTECTION TARGET VOLUME — 8210

| LOGICAL ID | STORAGE SYSTEM ID | DISK CAPACITY (MB) | UPDATE ACCESS CHARACTERISTIC (MBps) |
|---|---|---|---|
| 1 | 2000 | 100000 | 100 |

CANDIDATE VOLUME SELECTION CONDITION — 8220

| | COPY DATA STORAGE VOLUME | | UPDATE REQUEST STORAGE VOLUME | |
|---|---|---|---|---|
| CONTINUOUS DATA PROTECTION PERIOD (SECONDS) | DISK CAPACITY (MB) | UPDATE ACCESS CHARACTERISTIC (MBps) | DISK CAPACITY (MB) | UPDATE ACCESS CHARACTERISTIC (MBps) |
| 3600 | 100000 | 100 | 360000 | 100 |

[CANCEL] [OK]

FIG.9

CANDIDATE VOLUME DECISION SCREEN — 8300

COPY DATA STORAGE VOLUME — 8310

| LOGICAL ID | STORAGE SYSTEM ID | DISK CAPACITY (MB) | UPDATE ACCESS CHARACTERISTIC (MBps) |
|---|---|---|---|
| ☐ 110 | 2000 | 100000 | 200 |
| ☐ 111 | 2000 | 100000 | 100 |

UPDATE REQUEST STORAGE VOLUME — 8320

| LOGICAL ID | STORAGE SYSTEM ID | DISK CAPACITY (MB) | UPDATE ACCESS CHARACTERISTIC (MBps) |
|---|---|---|---|
| ☐ 121 | 2000 | 500000 | 200 |
| ☐ 122 | 2000 | 500000 | 100 |

[ OK ]   [ CANCEL ]

FIG.10

CONTINUOUS DATA PROTECTION APPLICATION CONFIRMATION SCREEN — 8400

8410
| CONTINUOUS DATA PROTECTION PERIOD (SECONDS) |
|---|
| 3600 |

8420 — CONTINUOUS DATA PROTECTION TARGET VOLUME

| | LOGICAL ID | STORAGE SYSTEM ID | DISK CAPACITY (MB) | UPDATE ACCESS CHARACTERISTIC (MBps) |
|---|---|---|---|---|
| | 1 | 2000 | 100000 | 100 |

8430 — CONTINUOUS DATA PROTECTION VOLUME

| VOLUME TYPE | LOGICAL ID | STORAGE SYSTEM ID | DISK CAPACITY (MB) | UPDATE ACCESS CHARACTERISTIC (MBps) |
|---|---|---|---|---|
| COPY DATA STORAGE VOLUME | 111 | 2000 | 100000 | 100 |
| UPDATE REQUEST STORAGE VOLUME | 121 | 2000 | 500000 | 200 |

[ CANCEL ]   [ OK ]

| ACCESS CHARACTERISTIC MONITOR CONDITION ||||
|---|---|---|---|
| LOGICAL ID | STORAGE SYSTEM ID | MONITOR PERIOD (SECONDS) | MONITOR STATE |
| 1 | 2000 | 3600 | MONITOR COMPLETED |
| 2 | 2000 | 3600 | MONITOR COMPLETED |
| 3 | 2000 | 18000 | MONITOR IN PROCESS |

| ACCESS CHARACTERISTIC MONITOR INFORMATION ||||
|---|---|---|---|
| LOGICAL ID | STORAGE SYSTEM ID | TIME | UPDATE ACCESS CHARACTERISTIC (MBps) |
| 2 | 2000 | 2006/11/18 14:00:54 | 50 |
| 2 | 2000 | 2006/11/18 14:00:55 | 60 |
| 2 | 2000 | 2006/11/18 14:00:56 | 10 |
| 2 | 2000 | 2006/11/18 14:00:57 | 0 |
| 2 | 2000 | 2006/11/18 14:00:58 | 0 |
| 2 | 2000 | 2006/11/18 14:00:59 | 0 |
| 2 | 2000 | 2006/11/18 14:01:00 | 0 |
| 2 | 2000 | 2006/11/18 14:01:01 | 10 |

FIG.18

ACCESS CHARACTERISTIC MONITOR CONDITION INPUT SCREEN — 8500

MONITOR TARGET VOLUME — 8510

| STORAGE SYSTEM ID | 2000 |
|---|---|
| LOGICAL ID | 1 |

MONITOR CONDITION — 8520

| MONITOR PERIOD (SECONDS) | 3600 |
|---|---|

[ CANCEL ]  [ OK ]

FIG.19

ACCESS CHARACTERISTIC MONITOR CONDITION INPUT SCREEN — 8600

| LOGICAL ID | STORAGE SYSTEM ID | MONITOR PERIOD (SECONDS) | MONITOR STATE |
|---|---|---|---|
| ☐ 1 | 2000 | 3600 | MONITOR COMPLETED |
| ☐ 2 | 2000 | 3600 | MONITOR COMPLETED |
| ☐ 3 | 2000 | 18000 | MONITOR IN PROCESS |

— 8610

[ MONITOR END ]  [ OK ]

FIG.20

CANDIDATE VOLUME SELECTION CONDITION CONFIRMATION SCREEN — 8700

CONTINUOUS DATA PROTECTION APPLICATION STATE — 8710

CONTINUOUS DATA PROTECTION TARGET VOLUME — 8711

| LOGICAL ID | STORAGE SYSTEM ID | DISK CAPACITY (MB) | UPDATE ACCESS CHARACTERISTIC (MBps) |
|---|---|---|---|
| 2 | 2000 | 100000 | 200 |

COPY DATA STORAGE VOLUME — 8712 / UPDATE REQUEST STORAGE VOLUME — 8713, 8714

| CONTINUOUS DATA PROTECTION PERIOD (SECONDS) | LOGICAL ID | DISK CAPACITY (MB) | UPDATE ACCESS CHARACTERISTIC (MBps) | LOGICAL ID | DISK CAPACITY (MB) | UPDATE ACCESS CHARACTERISTIC (MBps) |
|---|---|---|---|---|---|---|
| 3600 | 21 | 100000 | 100 | 22 | 23000 | 100 |

CANDIDATE VOLUME SELECTION CONDITION — 8720

COPY DATA STORAGE VOLUME / UPDATE REQUEST STORAGE VOLUME

| CONTINUOUS DATA PROTECTION PERIOD (SECONDS) | DISK CAPACITY (MB) | UPDATE ACCESS CHARACTERISTIC (MBps) | DISK CAPACITY (MB) | UPDATE ACCESS CHARACTERISTIC (MBps) |
|---|---|---|---|---|
| 3600 | 100000 | 5 | 23000 | 60 |

[ CANCEL ]  [ OK ]

FIG.21

CANDIDATE VOLUME DECISION SCREEN — 8800

CONTINUOUS DATA PROTECTION TARGET VOLUME — 8810

| VOLUME | LOGICAL ID | STORAGE SYSTEM ID | DISK CAPACITY (MB) | UPDATE ACCESS CHARACTERISTIC (MBps) |
|---|---|---|---|---|
| PROTECTION TARGET VOLUME | 2 | 2000 | 100000 | 100 |
| COPY DATA STORAGE VOLUME | 21 | 2000 | 100000 | 100 |
| UPDATE REQUEST STORAGE VOLUME | 22 | 2000 | 500000 | 100 |

CONTINUOUS DATA PROTECTION TARGET VOLUME — 8820

COPY DATA STORAGE VOLUME — 8821

| LOGICAL ID | STORAGE SYSTEM ID | DISK CAPACITY (MB) | UPDATE ACCESS CHARACTERISTIC (MBps) |
|---|---|---|---|
| ☐ 211 | 2000 | 100000 | 20 |
| ☐ 212 | 2000 | 100000 | 10 |
| ☐ 213 | 2000 | 100000 | 5 |

UPDATE REQUEST STORAGE VOLUME — 8822

| LOGICAL ID | STORAGE SYSTEM ID | DISK CAPACITY (MB) | UPDATE ACCESS CHARACTERISTIC (MBps) |
|---|---|---|---|
| ☐ 221 | 2000 | 100000 | 100 |
| ☐ 222 | 2000 | 100000 | 70 |
| ☐ 223 | 2000 | 50000 | 100 |

[CANCEL] [OK]

FIG.23

CANDIDATE VOLUME DECISION SCREEN  8830

CONTINUOUS DATA PROTECTION APPLICATION STATE

| VOLUME | LOGICAL ID | STORAGE SYSTEM ID | DISK CAPACITY (MB) | UPDATE ACCESS CHARACTERISTIC (MBps) |
|---|---|---|---|---|
| PROTECTION TARGET VOLUME | 2 | 2000 | 100000 | 100 |
| COPY DATA STORAGE VOLUME | 21 | 2000 | 100000 | 100 |
| UPDATE REQUEST STORAGE VOLUME | 22 | 2000 | 500000 | 100 |

CANDIDATE VOLUME LIST

| CANDIDATE ID | COPY DATA STORAGE VOLUME | | | | UPDATE REQUEST STORAGE VOLUME | | | |
|---|---|---|---|---|---|---|---|---|
| | LOGICAL ID | STORAGE SYSTEM ID | DISK CAPACITY (MB) | UPDATE ACCESS CHARACTERISTIC (MBps) | LOGICAL ID | STORAGE SYSTEM ID | DISK CAPACITY (MB) | UPDATE ACCESS CHARACTERISTIC (MBps) |
| ☐ 1 | 211 | 2000 | 100000 | 100 | 221 | 2000 | 100000 | 100 |
| ☐ 2 | 211 | 2000 | 100000 | 100 | 222 | 2000 | 100000 | 70 |
| ☐ 3 | 211 | 2000 | 100000 | 100 | 223 | 2000 | 50000 | 100 |
| ☐ 4 | 211 | 2000 | 100000 | 10 | 224 | 2000 | 30000 | 70 |
| ☐ 5 | 212 | 2000 | 100000 | 10 | 221 | 2000 | 100000 | 100 |
| ☐ 6 | 212 | 2000 | 100000 | 10 | 222 | 2000 | 100000 | 70 |
| ☐ 7 | 212 | 2000 | 100000 | 10 | 223 | 2000 | 50000 | 100 |

OK   CANCEL

METHOD AND SYSTEM FOR CONTINUOUS DATA PROTECTION

INCORPORATION BY REFERENCE

The present application claims priority from Japanese application JP2007-042347 filed on Feb. 22, 2007, the content of which is hereby incorporated by reference into this application.

BACKGROUND OF THE INVENTION

The present invention relates to a method of and a system for selecting, at application of Continuous Data Protection (CDP), storage volumes to store copy data and update requests.

A storage system includes at least one volume and may also include a plurality of volumes having different physical characteristics.

The continuous data protection system continuously protects data stored in volumes in the storage system. Specifically, the continuous data protection system includes a function to read data from a volume (a protection target volume) designated as a target of continuous data protection and to store the data in a volume (a copy data storage volume) designated as a storage destination of copy data, a function to store an update request of data for the protection target volume in a volume (an update request storage volume) designated as a storage destination of the update request, and a function to update the copy data in the copy data storage volume by storing, according to a designated condition, the update request to be stored in the update request storage volume in the copy data storage volume. The system also includes a function which updates the copy data in the copy data storage volume by use of update requests in the update request storage volume to restore data in the protection target volume to a predetermined position of the update requests stored in the update request storage volume.

JP-A-2005-18738 describes an example of implementation of continuous data protection, specifically, a relationship between a function (a snapshot function) to store data in a protection target volume at a point of time in a copy data storage volume and a function (a journal entry function) to store an update request of data in an update request storage volume. It is predicted that quite a large number of journal entries are to be handled. To cope with this difficulty, if the number of unused areas of the update request storage volume is less than a limit value, the journal entries are updated onto the snapshot.

JP-A-2006-134323 describes a method of deriving the capacity and processing performance of a journal volume according to a Recovery Point Objective (RPO) and a Recovery Time Objective (RTO) designated by the user.

SUMMARY OF THE INVENTION

It is required to efficiently produce a backup of the large amount of continuous data stored in the protection target volume. In the storage system, it is important how to select the copy data to produce the backup of the continuous data and how to select the update request storage volume. However, in JP-A-2005-18738 and JP-A-2006-134323, it is assumed that the capacity of the update request storage volume inevitably becomes insufficient. In consideration of reliability of the storage system, it is quite important to prevent occurrence of the event in which the capacity of the update request storage volume becomes insufficient. In other words, it is important how to beforehand select the copy data storage volume and the update request storage volume.

For a protection target volume, the copy data storage volume and the update request storage volume vary in the capacity thereof according to the access characteristic of the protection target volume. Therefore, it is required to select the copy data storage volume and the update request storage volume according to the access characteristic of the protection target volume. However, how to select these volumes is not easy for the user. "According to the access characteristic of the protection target volume" indicates a condition for an operation in which the update request to the protection target volume is securely stored in the update request storage volume without adversely affecting the update performance of the protection target volume in operation.

It is therefore an object of the present invention, which has been devised to solve the problem, to provide a continuous data protection method and a continuous data protection system in which at application of continuous data protection, a copy data storage volume and an update request storage volume can be easily selected.

According to the present invention, there is provided a continuous data protection method of continuously protecting data stored in a protection target volume of a storage by use of a copy data storage volume to store therein copy data created by copying the data and an update request storage volume to store therein an update request from a host to the protection target volume, including the step, conducted by a management server to manage the storage, of calculating a selection condition of a candidate for the copy data storage volume and a selection condition of a candidate for the update request storage volume on the basis of a continuous data protection period in which the data of the protection target volume is continuously protected and a disk capacity and an update access characteristic of the protection target volume, and selecting candidates for the copy data storage volume and candidates for the update request storage volume.

The continuous data protection method further includes the step of setting the selection conditions, the step including setting a value based on the disk capacity of the protection target volume as a disk capacity of the copy data storage volume, setting a value based on an upper-limit value of the update access characteristic of the protection target volume as an update access characteristic of the copy data storage volume, setting a value based on a product between the upper-limit value of the update access characteristic of the protection target volume and the continuous data protection period as a disk capacity of the update request storage volume, and a value based on the upper-limit value of the update access characteristic of the protection target volume as an update access characteristic of the update request storage volume.

According to the present invention, at application of continuous data protection, the copy data storage volume and the update request storage volume can be easily selected.

BRIEF DESCRIPTION OF THE DRAWINGS

FIG. 5 is an explanatory diagram showing an example of a volume selection condition.

FIG. 6 is an explanatory diagram showing an example of volume management information.

FIG. 8 is an explanatory diagram showing an example of a candidate volume selection condition confirmation screen in the first embodiment.

FIG. 9 is an explanatory diagram showing an example of a candidate volume decision screen in the first embodiment.

FIG. 10 is an explanatory diagram showing an example of a continuous data protection application confirmation screen.

FIG. 16 is an explanatory diagram showing an example of an access characteristic monitor condition.

FIG. 17 is an explanatory diagram showing an example of access characteristic monitor information.

FIG. 18 is an explanatory diagram showing an example of an access characteristic monitor condition input screen.

FIG. 19 is an explanatory diagram showing an example of an access characteristic monitor state confirmation screen.

FIG. 20 is an explanatory diagram showing an example of a candidate volume selection confirmation screen in the second embodiment.

FIG. 21 is an explanatory diagram showing an example of a candidate volume decision screen in the second embodiment.

FIG. 23 is an explanatory diagram showing an example of a candidate volume decision screen in a third embodiment.

DESCRIPTION OF THE EMBODIMENTS

Figure 1:
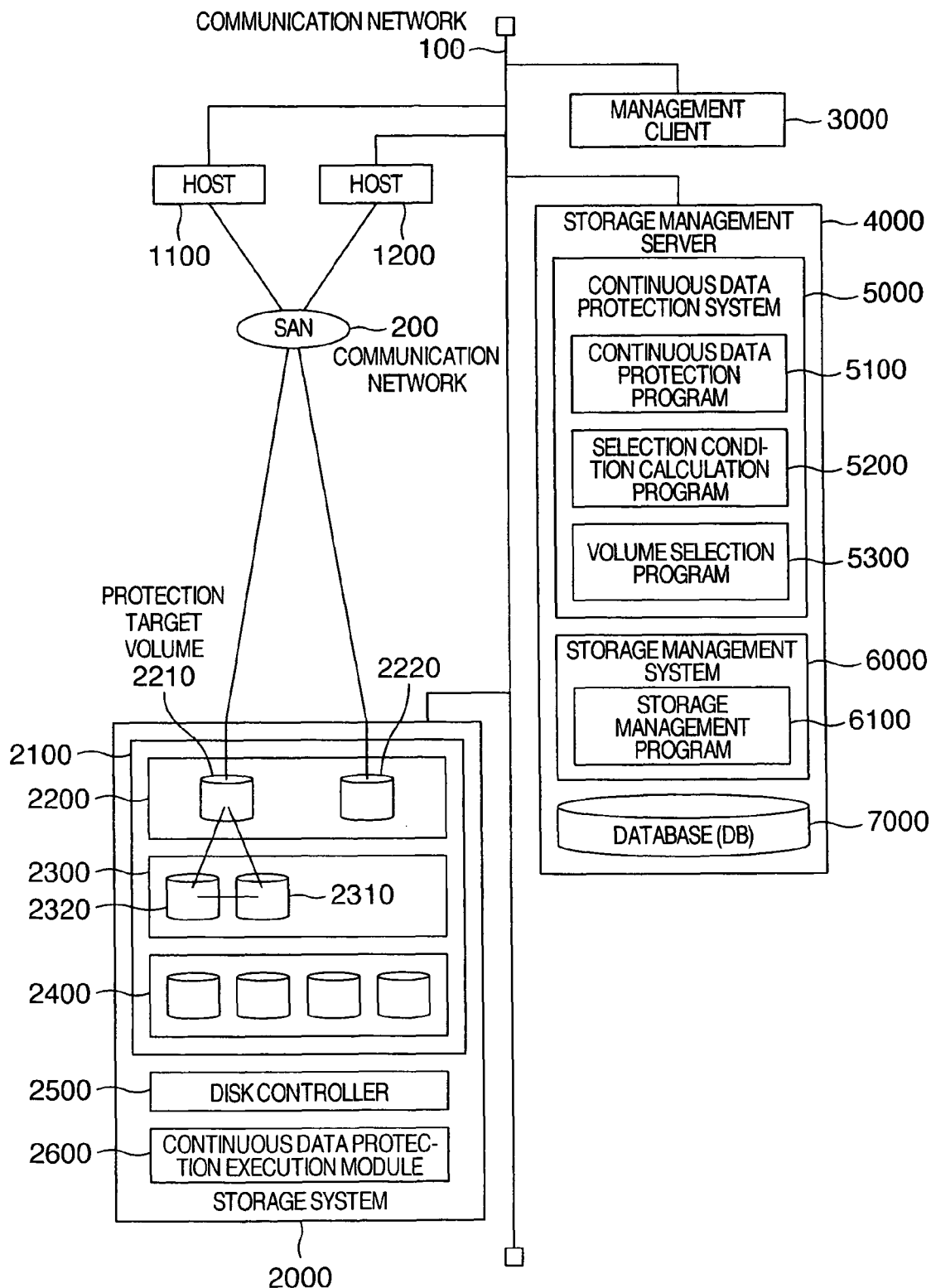
FIG. 1 is a block diagram showing an overall configuration of a first embodiment of an information management system.

Referring now to the drawings, description will be given of embodiments of the present invention.

First Embodiment

Figure 11:
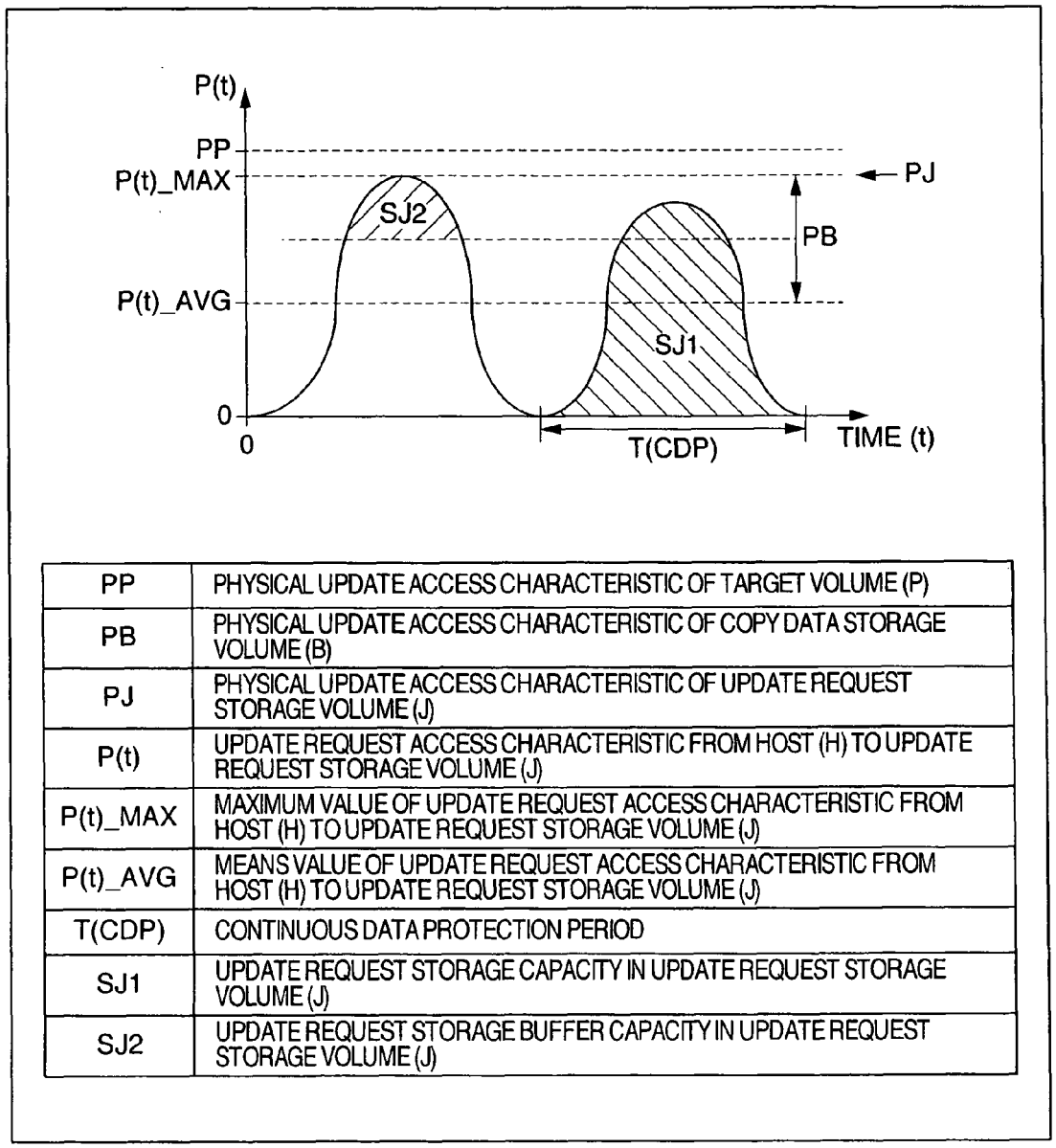
FIG. 11 is an explanatory diagram showing a relationship between time and update access characteristics in continuous data protection.

FIG. 11 is an explanatory diagram showing a relationship between time and update access characteristics in continuous data protection. The continuous data protection is protection in which backup data is continuously produced for data (protection target data) in, for example, a storage system to make it possible to restore data to a particular point. First, by referring to FIG. 11, description will be given of a relationship between an update access characteristic of update access from a host to a protection target volume, selection of candidates for a copy data storage volume and an update request storage volume, and selection conditions for these volumes in the first embodiment.

FIG. 11 shows a graph in which the abscissa represents time and the ordinate represents a characteristic of update request access (for example, Mega Bytes per second (MBps) of write performance) from a host to the update request storage volume. As can be seen from the graph, the update access characteristic P(t) from the host to the protection target volume at time t varies with a lapse of time depending on, for example, an application program or the like operating on the host.

In the graph, PP indicates an update access characteristic (physical update access characteristic) of a physical characteristic of the target volume (P). PB is an update access characteristic of a physical characteristic of a copy data storage volume (B). PJ is an update access characteristic of a physical characteristic of an update request storage volume (J). P(t) is a characteristic of update access from the host (H) to the update request storage volume (J). P(t)_MAX indicates a maximum value of the update access characteristic from the host (H) to the update request storage volume (J). P(t)_AVG is an average or a mean value of the update access characteristic from the host (H) to the update request storage volume (J). T(CDP) is a continuous data protection period. SJ1 is update request storage capacity of the update request storage volume (J). SJ2 is an update request storage buffer capacity of the update request storage volume (J).

According to an aspect of the first embodiment, it is possible to easily select the copy data storage volume and the update request storage volume in consideration of the update access characteristic from the host to the protection target volume. If consideration is not given to the update access characteristic from the host to the protection target volume, there appear various problems. Description will now be given of such problems and solutions thereof.

(1) When the update access characteristic PB of the physical characteristic of a copy data storage volume is less than the update access characteristic P(t)_AVG as a mean value of the update access characteristic P(t)

The amount of data of the update request access from the host to the update request storage volume in a predetermined period of time exceeds the amount of the update request access data written from the update request storage volume into the copy data storage volume. As a result, the update access characteristic of the update request storage volume is equal to or less than that of the physical characteristic and hence the update access characteristic of the protection target volume is equal to or less than that of the update request storage volume. In this situation, to continuously protect data in the protection target volume to keep the update access characteristic of the protection target volume, it is required that the update access characteristic PB of the physical characteristic of the copy data storage volume exceeds the update access characteristic P(t)_AVG as a mean value of the update access characteristic P(t). In FIG. 11, PB must be more than P(t)_AVG.

(2) The update access characteristic PJ of the physical characteristic of the update request storage volume is less than the maximum value P(t)_MAX of the update access characteristic P(t) of the update request storage volume At occurrence of an event in which the update request access of the protection target volume has the update access characteristic P(t) exceeding the update access characteristic PJ of the physical characteristic of the update request storage volume, the update access characteristic of the protection target volume lowers. Therefore, to continuously protect data in the protection target volume to keep the update access characteristic of the protection target volume, it is required that the update access characteristic PJ must be equal to more than the maximum value P(t)_MAX. However, it is physically not possible that the update access characteristic exceeds P(t)_MAX.

(3) When the update request storage volume makes it possible that data in the protection target volume is continuously protected and the protection target volume is restored to a particular position within a designated continuous data protection period The update request storage volume must store data at least for a continuous data protection period T(CDP) for which the update access characteristic P(t) is designated. Specifically, the update request storage volume must have a disk capacity calculated through integration between the update access characteristic of the physical characteristic of the protection target volume and the continuous data protection period.

(4) When the update access characteristic PB of the physical characteristic of the copy data storage volume is less than the update access characteristic PJ of the physical characteristic of the update request storage volume During a period in which an update request of the update access characteristic exceeding the update access characteristic PB occurs for the update request storage volume, it is required to store also the update request access exceeding the update access characteristic PB in the update request storage volume. Therefore, the update request storage volume must have a disk volume to store the data requested in (3) and (4).

In this connection, the copy data storage volume stores the copy data of the protection target volume and hence must have a disk capacity substantially equal to that of the protection target volume. Therefore, the disk capacity of the protection target volume is adopted as a selection condition of the disk capacity of the copy data storage volume.

FIG. 1 is a block diagram showing an overall configuration of the first embodiment of an information management system. The system includes hosts 1100 and 1200, a storage system 2000, a management client 3000, and a storage management server 4000. The hosts 1100 and 1200 connect to the storage system 2000 via a communication network 200 and a Storage Area Network (SAN). The storage management server 4000 connects via a communication network 100 such as a Local Area Network (LAN) 100 to the hosts 1100 and 1200, the storage system 2000, and the management client 3000. The hosts 1100 and 1200 respectively use volumes 2100 (e.g., protection target volumes 2210 and 2220) of the storage system 2000.

The storage system 2000 includes volumes 2100, a disk controller 2500, and a continuous data protection execution module 2600. The volumes 2100 include volumes being used by the hosts 1100 and 1200, continuous data protection volumes 2300 to be used by the protection execution module 2600 to continuously protect data therein, and unused volumes 2400 not in use. The disk controller 2500 controls data input and output operations for each of the volumes 2100. The continuous data protection execution module 2600 continuously protects, in response to an instruction from a continuous data protection program 5100, which will be described later, data in a designated volume by use of a copy data storage volume 2320 designated and selected from the continuous data protection volumes 2300 and an update request storage volume 2310 similarly designated as above.

FIG. 1 shows a state in which by use of the update request storage volume 2310 and the copy data storage volume 2320, the system continuously protects the data in the volume (protection target volume) 2210 being used by the host 1100. The method of continuously protecting data using the continuous data protection program 5100 and the continuous data protection execution module 2600 has been described in an article cited, for example, in JP-2005-18738, and hence details thereof will not be described.

The management client 3000 is a computer including a Central Processing Unit (CPU), an Input Interface (I/P), an input section, and an output section. The management client 3000 notifies the storage management server 4000 of information inputted by the user and outputs therefrom information received, for example, from the storage management server 4000.

The storage management server 4000 includes a continuous data protection system 5000, a storage management system 6000, and a database 7000.

The continuous data protection system 5000 stores in a memory 4500 the continuous data protection program 5100, a selection condition calculation program 5200, and a volume selection program 5300 of the continuous data protection system 5000, which will be described later in conjunction with FIG. 2.

The continuous data protection program 5100 instructs the continuous data protection execution module 2600 to continuously protect data in the designated protection target volume using the designated copy data storage volume 2320 and the designated update request storage volume 2310. The selection condition calculation program 5200 calculates a selection condition to select the copy data storage volume 2320 and the update request storage volume 2310 to be used to protect the protection target volume 2210 to which continuous data protection is applied. The volume selection program 5300 selects candidates for the copy data storage volume 2320 and the update request storage volume 2310 on the basis of the selection condition calculated by the selection condition calculation program 5200. Details of the continuous data protection system 5000 will be described later by referring to FIG. 2.

Figure 2:
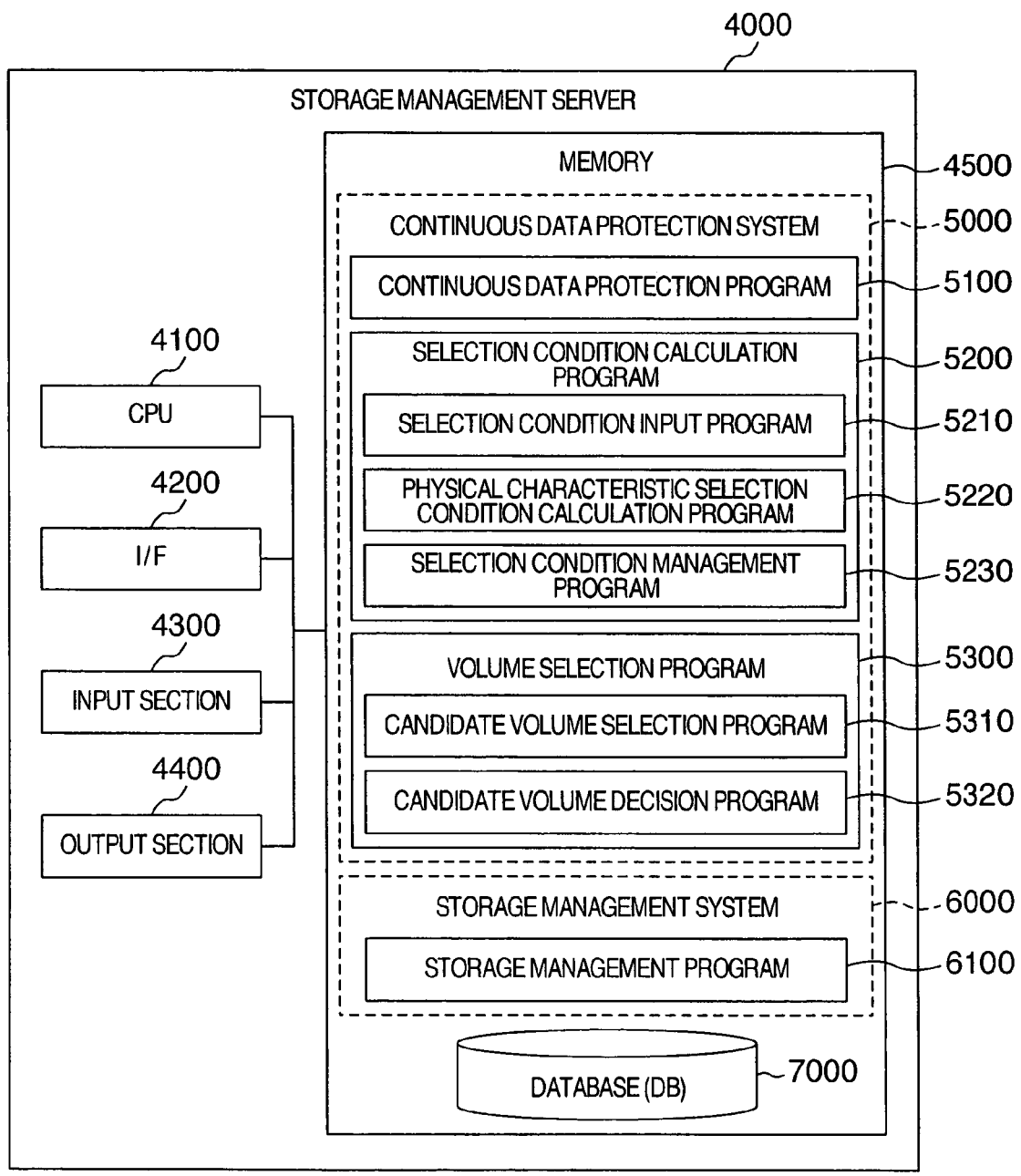
FIG. 2 is a block diagram showing details of a storage management server in the first embodiment.

The storage management system 6000 stores a storage management program 6100 in the memory 4500 (FIG. 2). The storage management program 6100 manages the volumes 2100 and the like in the storage system 2000.

The database (DB) 7000 stores in the memory 4500 (FIG. 2) data required for the management of volumes 2100 in the storage system 2000 by the storage management program 6100, the management of continuous data protection by the continuous data protection program 5100, and the management of the volume selection condition by the selection condition calculation program 5200.

FIG. 2 is a block diagram showing details of the storage management server 4000 in the first embodiment. The storage management server 4000 includes a CPU 4100, an interface (I/F) 4200, an input section 4300, an output section 4400, and a memory 4500.

The CPU 4100 executes programs on the memory 4500. The interface 4200 connects via the communication network 100 to the hosts 1100 and 1200, the storage system 2000, and the management client 3000. The input section 4300 is an input device such as a mouse or a keyboard which receives an input from the user and notifies the input to the program in the memory 4500. The output section 4400 is an output device such as a display to notify the user of information outputted from, for example, the program in the memory 4500.

The memory 4500 stores therein programs constituting the continuous data protection system 5000 such as the continuous data protection program 5100, the selection condition calculation program 5200, the volume selection program 5300, the programs of the storage management system 6000, and the database (DB) 7000.

The continuous data protection program 5100 issues an indication to the continuous data protection execution module 2600 to continuously protect data in a designated protection target volume selected from the volumes belonging to the storage system 200 connected to the storage management server 4000, for example, via the communication network 200, by use of the designated copy data storage volume and the designated update request storage volume.

The selection condition calculation program 5200 includes a selection condition input program 5210, a physical characteristic selection condition calculation program 5220, and a selection condition management program 5230. The program 5200 receives a selection condition from the user and calculates, according to the selection condition, a selection condition to select a copy data storage volume and an update request storage volume to manage the received and calculated selection conditions and the like.

The selection condition input program 5210 receives an input of a continuous data protection period in which data in a protection target volume is to be continuously protected, the input including a selection condition to select candidates of the copy data and update request storage volumes to continuously protect data in the protection target volume. The program 5210 stores the received continuous data protection period and information of the designated protection target volume in a volume selection condition field of the database (DB) 7000 managed by the selection condition management program 5230. Details of the database 7000 will be described later in conjunction with FIG. 3.

The physical characteristic selection condition calculation program 5220 obtains information regarding a volume from volume management information 7850 in storage management information 7800 (FIG. 3) managed by the storage management program 6100 to create a selection condition according to a physical characteristic of the volume. The created selection information is stored in the volume selection condition field 7300 managed by the selection condition management program 5230.

Specifically, description will be given of various selection conditions using an example in which continuous data protection is conducted for the protection target volume 2210 shown in FIG. 1.

The copy data storage volume 2320 stores copy data of the protection target volume 2210 and hence must have a disk capacity substantially equal to that of the protection target volume 2210. This results in a selection condition that the disk capacity of the protection target volume 2210 is a value based on the disk capacity of the copy data storage volume 2320.

The update access characteristic of the physical characteristic required for the copy data storage volume 2320 must be equal to or more than a value based on the mean value of the update access characteristic from the host 1100 to the protection target volume 2210. However, it is assumed in the embodiment that the condition cannot be satisfied. This leads to a selection condition that higher priority is assigned to continuously protect the data in the protection target volume, and the update access characteristic of the physical characteristic of the protection target volume 2210, which is a value based on the upper-limit value of the update access characteristic from the host 1100 to the protection target volume 2210, is set as the update access characteristic of the copy data storage volume 2320.

The update access characteristic of the physical characteristic required for the update request storage volume 2310 must be a value based on the maximum value of the update access characteristic from the host 1100 to the protection target volume 2210. However, it is assumed in the embodiment that the condition cannot be satisfied. There is hence obtained a selection condition that the update access characteristic of the physical characteristic of the protection target volume 2210, which is a value based on the upper limit value of the update access characteristic from the host 1100 to the protection target volume 2210, is set as the update access characteristic of the update request storage volume 2310.

The disk capacity of the update request storage volume 2310 must be equal to or more than a value based on the total of the update request storage capacity to store data for a continuous data protection period for which the update request from the host 1100 to the protection target volume 2210 is designated and the update request storage buffer capacity required when the update access characteristic of the copy data storage volume 2320 is less than that of the update request storage volume 2310. In the embodiment, however, since the update access characteristics respectively of the volumes 2320 and 2310 are set as the update access characteristic of the physical characteristic of the protection target volume which is the maximum value of the update access characteristic from the host 1100 to the protection target volume 2210, the update request storage buffer capacity is not required. Therefore, it is only necessary that the disk capacity of the volume 2310 is equal to or more than the update request storage capacity. This results in a selection condition that while assigning higher priority to the continuous protection of data in the protection target volume; as the value based on the maximum value of the update request storage capacity, the value based on the update request storage capacity calculated using the product between the update access characteristic of the protection target volume and the continuous data protection period is set as the disk capacity of the update request storage volume.

The physical characteristic selection condition calculation program 5220 stores the calculated selection condition in the volume selection condition 7300.

The selection condition management program 5230 stores, in response to a request from each program of the selection condition calculation program 5200, a designated selection condition in the volume selection condition 7300 in the database 7000.

The volume selection program 5300 includes a candidate volume selection program 5310 and a candidate decision program 5320. The selection program 5310 selects candidate volumes for the copy data and update request storage volumes according to a selection condition in the volume selection condition 7300 managed by the selection condition management program 5230.

The candidate decision program 5320 presents a list of candidate volumes selected by the selection program 5310 to the user, urging the user to uniquely determine a candidate volume. The program 5320 also requests the continuous data protection program 5100, by designating the copy data and update request storage volumes uniquely determined together with the protection target volume, to continuously protect data in the protection target volume.

The storage management system 6000 includes a storage management program 6100. The program 6100 manages the volumes 2100 and the like of the storage system 2000 and stores information managed by the program 6100 in the storage management information 7800 in the database (DB) 7000.

The database 7000 stores data required for the management of the storage system and volumes by the storage management system 6000, the continuous data management by the continuous data management program 5100, and the management of the volume selection condition by the selection condition calculation program 5200.

Figures 3, 4:
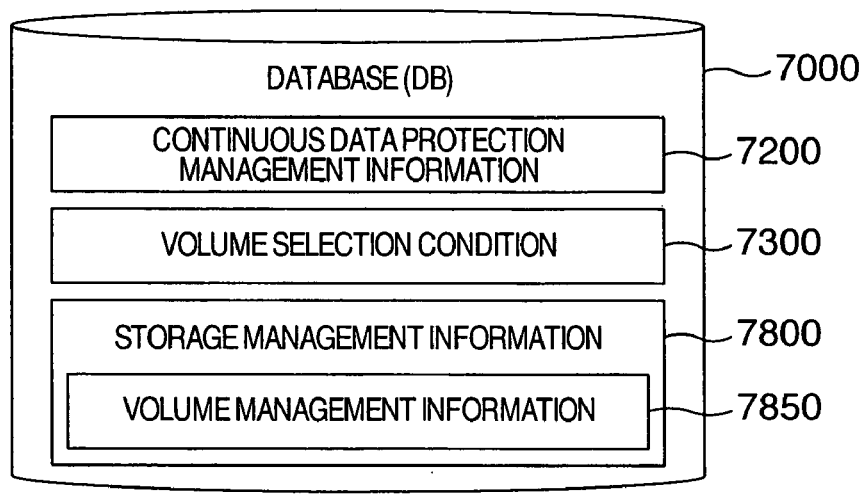
FIG. 3 is a block diagram showing details of a database in the first embodiment.
FIG. 4 is an explanatory diagram showing an example of continuous data protection management information.

FIG. 3 is a block diagram showing details of the database in the first embodiment. The database 7000 includes continuous data protection management information 7200 of the continuous data protection program 5100 (FIG. 2), a volume selection condition 7300, and storage management information 7800 associated with the storage management system 6000 (FIG. 2).

The continuous data protection management information 7200 stores therein information required for the continuous data protection management by the continuous data protection program 5100 (FIG. 2). In the embodiment, the information 7200 includes a protection target volume to which the continuous data protection is being applied, information of a combination of a copy data storage volume and an update request storage volume used to continuously protect data in the protection target volume, and a continuous data protection period as a period in which data in the protection target volume is continuously protected. Details of the information 7200 will be described later in conjunction with FIG. 4.

The volume selection condition 7300 stores therein a volume selection condition managed by the selection condition calculation program 5200 (FIG. 2). In the embodiment, the condition 7300 includes information to identify a protection target volume for the continuous data protection, a condition regarding a period in which data in the protection target volume is continuously protected, and a condition to select a copy data storage volume and an update request storage volume used to protect data in the protection target volume. Details of the information 7300 will be described later in conjunction with FIG. 5.

The storage management information 7800 stores therein information required for the storage system management by the storage management system 6000 (FIG. 2). In the embodiment, the information 7800 includes volume management information 7850. The volume management information 7850 includes an identification of a volume for the storage management system 6000 to uniquely identify the volume under control thereof, physical attributes of the volume such as a disk capacity and an update access characteristic, and a utilization state. Details of the information 7850 will be described later in conjunction with FIG. 6. In the embodiment, although the storage management information 7800 includes only the volume management information 7850, the information 7800 may also includes, for example, information of the storage system.

FIG. 4 is an explanatory diagram showing an example of the continuous data protection management information. In FIG. 4, the continuous data protection management information 7200 managed by the continuous data protection program 5100 is associated with a situation in which the continuous data protection is being applied to one volume. In the embodiment, the attributes to manage the continuous data protection in use include a logical ID, a storage system ID, a continuous data protection period, a copy data storage volume logical ID, and an update request storage volume logical ID.

The logical ID is an identifier to uniquely identify a volume in a storage system to which the volume belongs. The storage system ID is an identifier to represent a storage system to which the volume belongs. The continuous data protection period indicates a period in which data is continuously protected in the protection target volume. The protection period is indicated in, for example, units of seconds. The copy data storage volume logical ID is an identifier to uniquely identify in the storage system a copy data storage volume corresponding to the protection target volume. The update request storage volume logical ID is an identifier to unique identify in the storage system an update request storage volume corresponding to the protection target volume.

FIG. 5 is an explanatory diagram showing an example of the volume selection condition. The volume selection condition managed by the selection condition management program 5230 includes, as attributes to manage a condition to select a copy data storage volume and an update request storage volume, a logical ID, a storage system ID, a continuous data protection period, a copy data storage volume disk capacity, a copy data storage volume update access characteristic, an update request storage volume disk capacity, and an update request storage volume update access characteristic.

The logical ID is an identifier to uniquely identify the volume in a storage system to which the volume belongs. The storage system ID is an identifier to represent a storage system to which the volume belongs. The continuous data protection period is a selection condition indicating a period in which data is continuously protected in the protection target volume. The protection period is indicated in, for example, units of seconds. The copy data storage volume disk capacity is a selection condition indicating a disk capacity required for the copy disk storage volume. The copy data storage volume update access characteristic is a selection condition indicating an update access characteristic required for the copy data storage volume. The update request storage volume disk capacity is a selection condition indicating a disk capacity required for the update request storage volume. The update request storage volume update access characteristic is a selection condition indicating an update access characteristic required for the update request storage volume.

FIG. 6 is an explanatory diagram showing an example of the volume management information. The volume management information 7850 contained in the storage management information 7800 managed by the storage management system 6000 includes, as volume attributes to be managed, a logical ID, a storage system ID, a disk capacity, an update access characteristic, and a use state.

The logical ID is an identifier to uniquely identify the volume in a storage system to which the volume belongs. The storage system ID is an identifier to represent a storage system to which the volume belongs. The disk capacity indicates a disk capacity of the volume in units of Mega Bytes (MB). The update access characteristic is the maximum value of the physical update access characteristic of the volume, represented in, for example, units of Mega Bytes per second (MBps). The use state indicates whether or not the volume is in use, and includes a character string such as "in use" or "unused".

Figure 7:
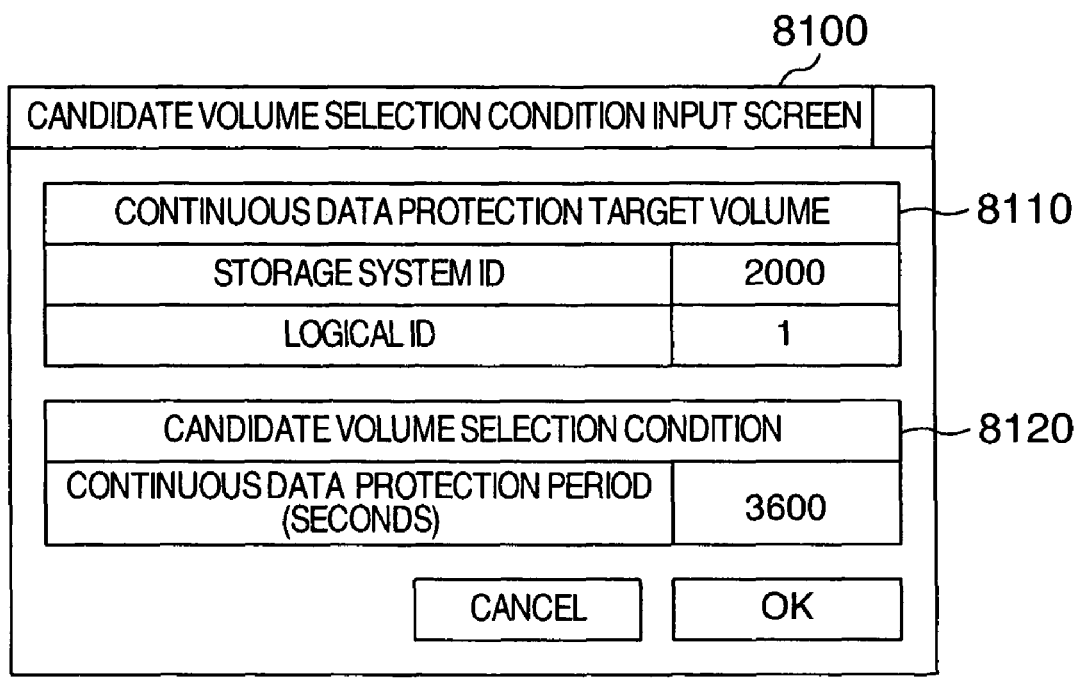
FIG. 7 is an explanatory diagram showing an example of a candidate volume selection condition input screen.

FIG. 7 is an explanatory diagram showing an example of a candidate volume selection condition input screen. The candidate volume selection condition input screen 8100 presented by the selection condition input program 5210 to the user includes a continuous data protection target volume information display area 8110 to display information regarding the continuous protection target volume and a candidate volume selection condition input area 8120 to urge the user to input therein a candidate volume selection condition. The continuous data protection target volume information display area 8110 includes a storage system ID and a logical ID. The storage system ID is an identifier to represent a storage system to which the volume belongs. The logical ID is an identifier to uniquely identify the volume in a storage system to which the volume belongs. The candidate volume selection condition input area 8120 includes a continuous data protection period input area to receive an input in units of, for example, seconds.

The condition input area 8120 is employed to designate therein the maximum period of time to restore, when failure occurs in a continuous data target volume, data of the protection target volume. For example, in an operation wherein the continuous data protection is carried out through a combination of one full backup of data of the protection target volume once per day and one differential backup of the data once per hour, the user designates one hour so that the data is recoverable at a particular position (at a particular of time) for a period of time shorter than one hour for which the data can be restored using the differential backup.

In the continuous data protection thus conducted by a combination of one full backup of data of the protection target volume once per day and one differential backup of the data once per hour, data of the continuous protection target volume is first stored in the copy data storage volume. Thereafter, update requests are saved in the update request storage volume for one hour of the designated continuous data protection period. The update request of which the continuous data protection period is expired is overwritten in the copy data storage volume, and the update request beforehand overwritten is deleted from the update request storage volume. As a result, the area thus reserved in the update request storage volume is used to continuously save an update request in the update request storage volume. According to the embodiment, at occurrence of an abnormality in the data of the protection target volume, the continuous data protection system is capable of recovering the data to a particular position (point of time) within the continuous data protection period.

FIG. 8 is an explanatory diagram showing an example of the candidate volume selection condition confirmation screen in the first embodiment. The candidate volume selection condition confirmation screen 8200 presented by the selection condition calculation program 5200 to the user includes a continuous data protection target volume information display area 8210 to display information regarding a protection target volume to be protected by the continuous data protection and a candidate volume selection condition display area 8220.

The volume information display area 8210 includes a logical ID, a storage system ID, a disk capacity, and an update access characteristic. These fields display the associated information items respectively stored in the volume management information 7850. These items are substantially the same as those of the information 7850 and hence description thereof will be avoided.

The candidate volume selection condition display area 8220 includes a continuous data protection period, a disk capacity and an update access characteristic of the copy data storage volume, and disk capacity and an update access characteristic of the update request storage volume. These items display the associated information items respectively stored in the volume selection condition 7300. Description thereof are the same as that of the information 7300 and hence will be avoided.

FIG. 9 is an explanatory diagram showing an example of a candidate volume decision screen in the first embodiment. The candidate volume decision screen 5320 presented by the candidate volume decision program 5320 to the user includes a list of candidates 8310 for the copy data storage volume and a list of candidates 8320 for the update request storage volume. The screen 5320 urges the user to select a copy data storage volume and an update request storage volume.

The list of candidates 8310 for the copy data storage volume includes a logical ID, a storage system ID, a disk capacity, and an update access characteristic. These items display the associated information items respectively stored in the volume management information 7850. Description thereof are the same as that of the information 7850 and hence will be avoided. The list of candidates 8320 for the update request storage volume includes, like the list of candidates 8310, a logical ID, a storage system ID, a disk capacity, and an update access characteristic. These items display the associated information items respectively stored in the volume management information 7850. Description thereof are the same as that of the information 7850 and hence will be avoided. In this connection, the logical ID column includes a check box to select a candidate.

FIG. 10 is an explanatory diagram showing an example of a continuous data protection application confirmation screen 8400. The confirmation screen 8400 presented by the candidate volume decision program 5320 to the user presents information regarding the candidate volume selected from the candidate volume decision screen 8300 by the user and information regarding a protection target volume to which the continuous data protection is applied using the candidate volume, thereby urging the user to determine application of the continuous data protection. The confirmation screen 8400 includes a continuous data protection period display area 8410 to display a continuous data protection period, a continuous data protection target volume information display area 8420 to display information regarding a continuous data protection target volume to be protected by the continuous data protection, and a continuous data protection volume information area 8430 to display information items regarding a copy data storage volume and an update request storage volume required to continuously protect the protection target volume.

The continuous data protection period display area 8410 displays information stored in the volume selection condition 7300. The protection target volume information display area 8420 includes a logical ID, a storage system ID, a disk capacity, and an update access characteristic. These fields display the associated information items respectively stored in the volume management information 7850. Description thereof are the same as that of the information 7850 and hence will be avoided. The continuous data protection volume information area 8430 includes a volume type, a logical ID, a storage system ID, a disk capacity, and an update access characteristic. The logical ID, a storage system ID, a disk capacity, and an update access characteristic displays the associated information items stored in the volume management information 7850. Description of these items are the same as that of the volume management information 7850 and hence will be avoided. The volume type is an attribute to identify a volume such as a copy data storage volume and an update request storage volume which are used to continuously protect the protection target volume. The volume type is represented by a character string, for example, "copy data storage volume" or "update request storage volume".

Figure 12:
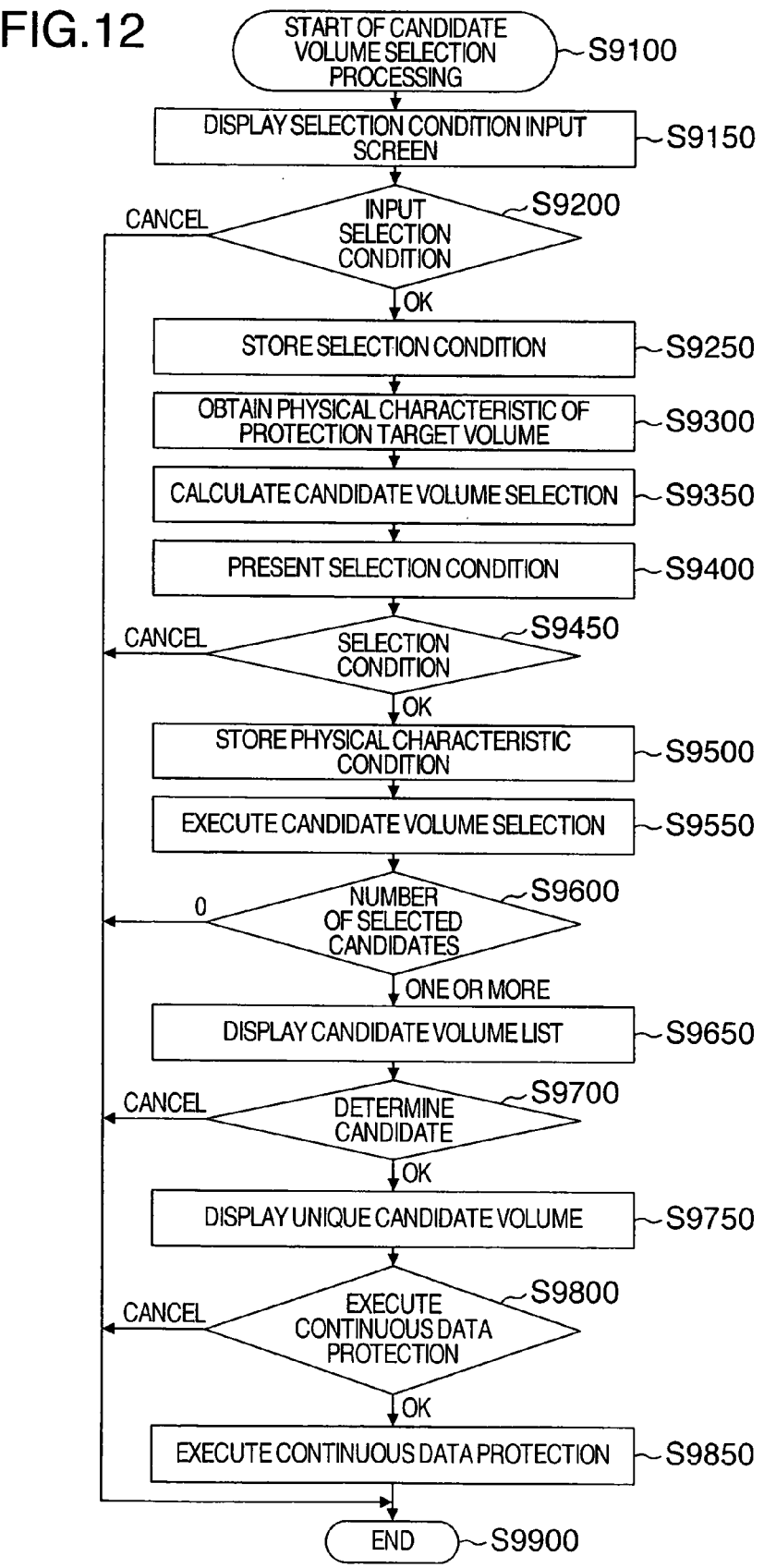
FIG. 12 is a flowchart showing candidate volume selection processing in the first embodiment.

FIG. 12 is a flowchart showing candidate volume selection processing in the first embodiment. In the processing shown in FIG. 12, for a copy data storage volume and an update request storage volume employed to apply the continuous data protection to a protection target volume, candidates are uniquely determined to carry out the continuous data protection. Description will be given of processing in which by using information obtainable and calculable in the embodiment, the candidates are selected for the copy data storage volume and the update request storage volume to apply the continuous data protection to a protection target volume.

The processing of FIG. 12 is started, for example, when the user designates a protection target volume and then requests retrieval of candidates for the copy data storage volume and the update request storage volume. It is not required that protection target volume designated in the operation is being used by the host and is connected to the host. The programs are executed by the CPU 4100. Description will be given of the programs according to necessity by referring to FIGS. 1 to 10.

After the selection condition calculation program 5200 is started, candidate volume selection processing is started (step S9100). The selection condition input program 5210 displays the candidate volume selection condition confirmation screen 8200 (FIG. 7; step S9150) to urge the user to input a continuous data protection period. The program 5210 determines whether or not an input of the selection condition is present (step S9200). If "cancel" is selected ("cancel" in step S9200), the program 5210 terminates the processing (step S9900). If the continuous data protection period is inputted and OK is selected (OK in step S9200), control goes to the next processing.

The selection condition input program 5210 notifies the selection condition management program 5230 of the designated protection target volume and the designated continuous data protection period. The program 5230 stores the target volume and the protection period in the volume selection condition 7300 (step S9250).

The physical characteristic selection condition calculation program 5220 obtains a physical characteristic of the protection target volume from the volume management information 7850 (step S9300). The program 5220 uses the update access characteristic of the protection target volume as the selection condition of the update access characteristic of the copy data storage volume, the update access characteristic of the protection target volume as the selection condition of the update access characteristic of the update request storage volume, and the disk capacity of the protection target volume as the selection condition of the copy data storage volume. The program 5220 calculates, as the selection condition of the disk capacity of the update request storage volume, an amount of data calculated according to the product of the designated continuous data protection period and the update access characteristic of the designated protection target volume (step S9350).

The physical characteristic selection condition calculation program 5220 presents the candidate volume selection condition confirmation screen 8200 (FIG. 8; step S9400) to urge the user to confirm the selection condition for the copy data storage volume and the update request storage volume. The program 5220 determines whether or not an input of the selection condition is present (step S9450). If "cancel" is selected ("cancel" in step S9450), the program 5220 terminates the processing (step S9900). If OK is selected (OK in step S9450), control goes to the next processing.

The selection condition calculation program 5200 notifies the selection condition to the candidate volume selection condition management program 5230. The program 5230 stores the candidate volume selection condition in the volume selection condition 7300 (step S9500). According to candidate volume selection condition stored in the volume selection condition 7300, the candidate volume selection program 5310 executes selection of the candidate volumes respectively for the copy data and update request storage volumes (step S9550). The program 5310 determines whether or not the number of candidates selected for each type of the volumes is one or more (step S9600). If the number of volumes selected for one of the types of the volumes is zero (0 in step S9600), the program 5310 terminates the processing (step S9900). If the numbers of volumes of the respective types selected as above are one or more (one or more in step S9600), control goes to the next processing.

The candidate volume decision program 5320 displays the candidate volume decision screen 8300 (FIG. 9; step S9650) to urge the user to uniquely determine one candidate for each of the copy data and update request storage volumes. The program 5320 determines whether or not the candidates have been determined (step S9700). If "cancel" is selected (cancel in step S9700), the processing is terminated (step S9900). If the candidate is uniquely determined for each of the copy data and update request storage volumes and OK is selected (OK in step S9700), control goes to the next processing.

The candidate volume decision program 5320 displays the continuous data protection application confirmation screen 8400 (step S9750) to urge the user to confirm application of the continuous data protection for the protection target volume by use of the copy data and update request storage volumes which are uniquely determined as above. The program 5320 determines whether or not the continuous data protection has been carried out (step S9800). If cancel is selected (cancel in step S9800), the processing is terminated (step S9900). If OK is selected (OK in step S9800), control goes to the next processing.

The candidate volume decision program 5320 requests the continuous data protection program 5100 to continuously protect data in the protection target volume by using the copy data and update request storage volumes thus uniquely determined (step S9850), and the processing sequence is terminated (step S9900).

According to an aspect of the first embodiment, the storage management server 4000 calculates the selection condition of the candidates for the copy data and update request storage volumes 2320 and 2310 according to the continuous data protection period T (CDP; FIG. 11) as a period to continuously protect data of the protection target volume 2210 and the disk capacity and the update access characteristic of the protection target volume. According to the selection condition, the server 4000 selects the candidates for the copy data and update request storage volumes 2320 and 2310.

According to another aspect of the first embodiment, for the selection condition, the disk capacity of the protection target volume 2210 is set as the disk capacity of the copy data storage volume 2320, the upper-limit value of the update access characteristic of the protection target volume 2210 is set as the update access characteristic of the copy data storage volume 2320, the disk capacity represented by the product between the upper-limit value of the update access characteristic and the continuous data protection period T(CDP) is set as the disk capacity of the update request storage volume 2310, and the upper-limit value of the update access characteristic of the protection target volume 2210 is set as the update access characteristic of the update request storage volume 2310.

According to the configuration, in a situation in which the continuous data protection is employed, the user is capable of easily selecting the copy data storage volume 2320 and the update request storage volume. According to the first embodiment the continuous data protection system, at occurrence of an abnormality in data of the protection target volume 2210, it is possible to restore data to a particular position (point of time) within the continuous data protection period T(CDP).

Second Embodiment

Description will be given of a second embodiment of the present invention. The second embodiment is a variation of the first embodiment. According to an aspect of the second embodiment, an access characteristic monitor program 5400 is disposed to monitor the update access characteristic of the protection target volume 2210.

Figure 13:
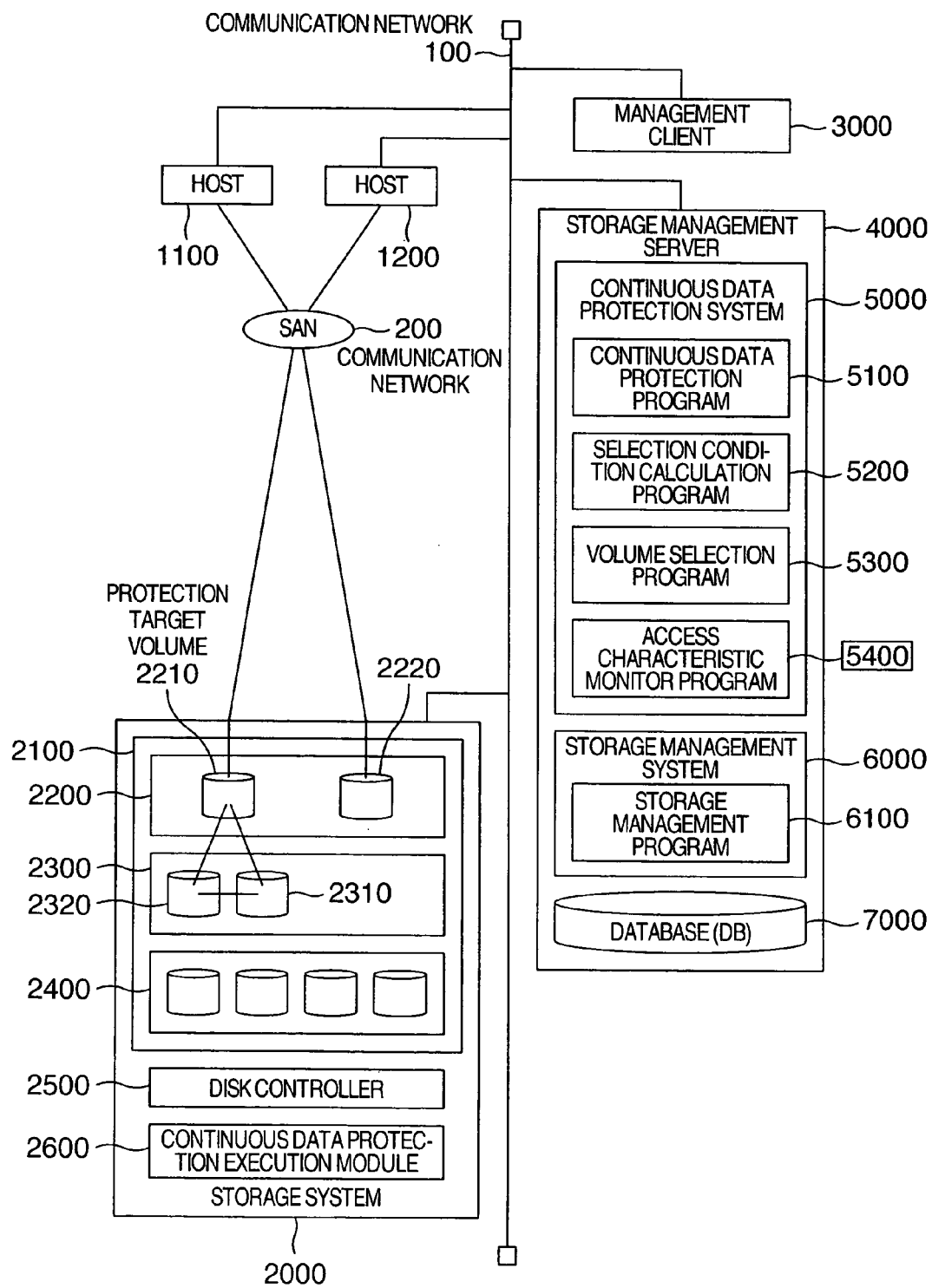
FIG. 13 is a block diagram showing an overall configuration of a second embodiment of an information management system.

FIG. 13 is a block diagram showing an overall configuration of the second embodiment of the information management system. The continuous data protection system 5000 of the second embodiment includes an access characteristic monitor program 5400 as an additional module. The constituent components as those of the first embodiment are assigned with the same reference numerals, and description thereof will be avoided. As can be seen from FIG. 13, the reference numeral of the additional module is placed in a rectangle for easy understanding. This also applies to the embodiments, which will be described later.

The access characteristic monitor program 5400 requests the disk controller 2500 to monitor the access characteristic of each volume belonging to the volumes 2100 of the storage management server 4000, the characteristic being the amount of input/output data per unitary time.

The disk controller 2500 of the second embodiment measures, in response to an indication from the access characteristic monitor program 5400, the access characteristic, i.e., the amount of input/output data per unitary time of each of the volumes belonging to the volume 2100 of the storage management server 4000.

Figure 14:
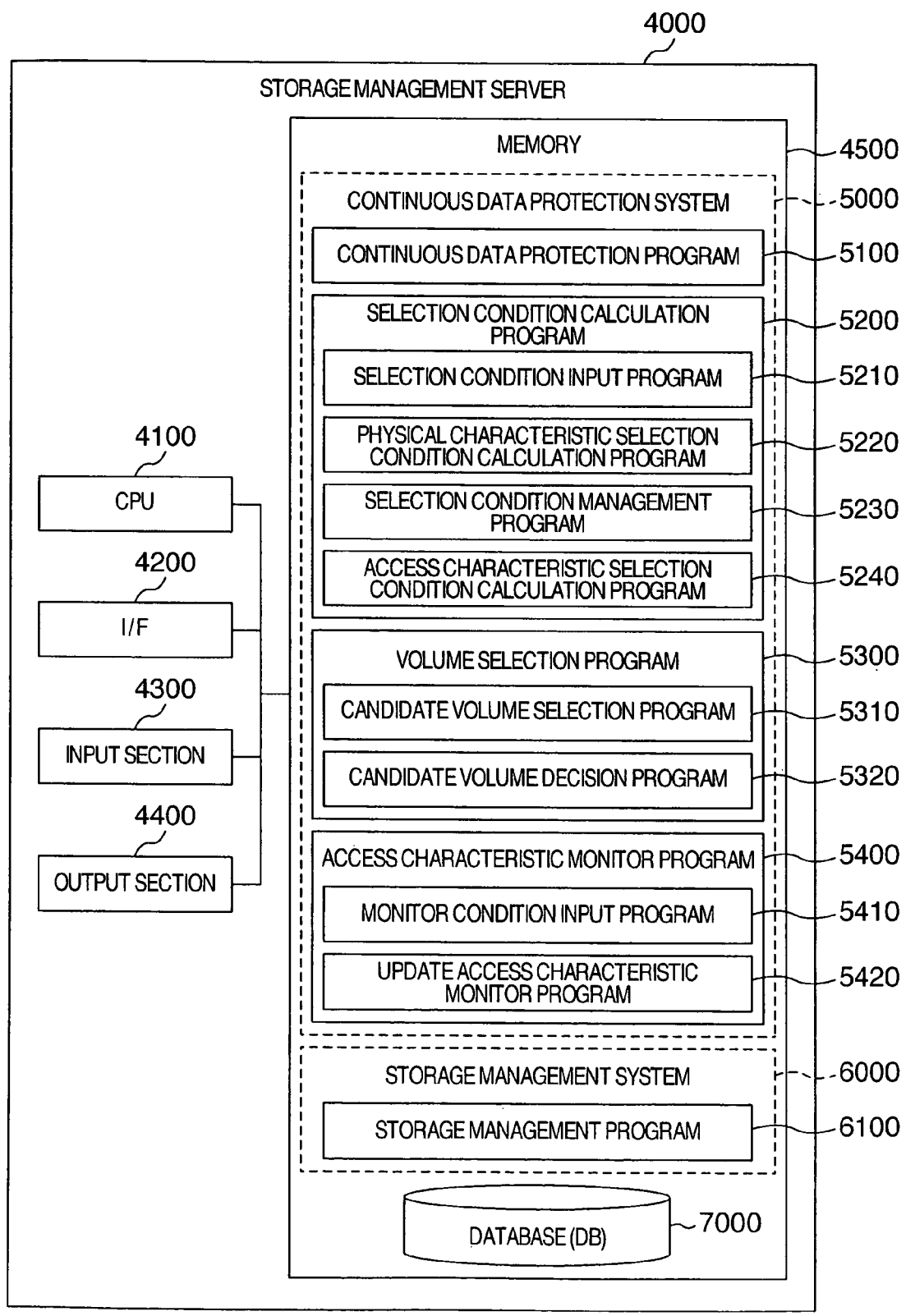
FIG. 14 is a block diagram showing details of a storage management server in the second embodiment.

FIG. 14 is a block diagram showing details of the storage management server in the second embodiment. The same constituent components as those of FIG. 1 will be assigned with the same reference numerals, and description thereof will be avoided. The memory 4500 stores therein the continuous data protection program 5100, the selection condition calculation program 5200, the volume selection program 5300, the storage management system 6000, the database (DB) 7000, and an access characteristic monitor program 5400. The program 5400 is additionally installed in the second embodiment. The programs 5100 and 5300 and the system 6000 are equivalent respectively to those of the first embodiment and hence will not be described. If any difference exists therebetween, description thereof will be described later.

The selection condition calculation program 5200 includes an access characteristic selection condition calculation program 5240 in addition to the selection condition input program 5210, the physical characteristic selection condition calculation program 5220, and the selection condition management program 5230. The physical characteristic selection condition calculation program 5220 and the selection condition management program 5230 are equivalent to those of the first embodiment, and hence description thereof will be avoided. In this regard, any difference therebetween, such as, the physical characteristic selection condition calculation program 5220, and the difference in the selection condition management program 5230 will be described.

In the second embodiment, if the continuous data protection has already been applied to the protection target volume designated by the user, the selection condition input program 5210 obtains the continuous data protection period designated to the continuous data protection under consideration from the continuous data protection management information 7200 managed by the continuous data protection program 5100 and presents the continuous data protection period to the user. If the user changes the protection period, the continuous data protection period thus designated by the user and information regarding the designated protection target volume are stored as the selection condition in the volume selection condition 7300 in the database 7000 managed by the selection condition management program 5230. The example of the first embodiment shown in FIG. 7 is also applicable as an example of the screen presented by the selection condition input program 5210 to the user, and hence description thereof will be avoided.

The access characteristic selection condition calculation program 5240 obtains update access characteristic monitor information of the target volume from the access characteristic monitor information 7240 managed by the update access characteristic monitor program 5420, which will be described later, and a selection condition for the target volume from the volume selection condition 7300 managed by the selection condition management program 5230 to create a selection condition regarding the update access characteristic by use of the obtained information items. The created selection condition is stored in the volume selection condition 7300. Specifically, the calculation program 5240 sets, as the maximum value of the update access characteristic, the maximum value of the update access characteristic within the obtained monitor period and sets, as the update access characteristic mean value, the mean value of the update access characteristic within the obtained monitor period.

The calculation program 5240 then calculates the amount of accumulated data of the successive update access characteristic values exceeding the update access characteristic mean value thus calculated. If there exists a plurality of groups of successive update access characteristic values exceeding the update access characteristic mean value, the amount of accumulated data is calculated for each group. The update access characteristic of the physical characteristic required for the copy data storage volume must be equal to or more than the mean value of the update access characteristic from the host to the protection target volumes. Therefore, based on the update access characteristic during the monitor period managed by the monitor program 5400, the calculation program 5240 calculates the mean value of the update access characteristic during the monitor period and sets the mean value as the selection condition of the update access characteristic of the copy data storage volume.

The disk capacity of the update request storage volume must be equal to or more than a value obtained on the basis of the total of the update request storage capacity to store the update request accesses from the host to the protection target volume for the designated continuous data protection period and the update request storage buffer capacity required when the update access characteristic of the copy data storage volume is less than that of the update request storage volume.

The access characteristic selection condition calculation program 5240 calculates the disk capacity of the update request storage volume using the product between the mean value of the update request access characteristic and the continuous data protection period. For the update access characteristic values exceeding the update access characteristic mean value, the amount of accumulated data of the update access characteristic that is the maximum during the continuous data protection period T(CDP) is calculated as the update request storage buffer capacity. The amount of accumulated data of the update access characteristic that is the maximum during the continuous data protection period T(CDP) is calculated, for example, as below. Assume that period T(CDP) is set as one hour and the monitor period is set as one day (24 hours). The calculation program 5240 selects the maximum of the amount of accumulated data of the update access characteristic during one hour arbitrarily selected from the 24-hour monitor period. The calculation program 5240 then sets a value based on the total of the update request storage capacity thus calculated and the update request storage buffer capacity as the selection condition of the disk capacity of the update request storage volume.

The update access characteristic of the physical characteristic required for the update request storage volume must be the maximum value of the update access characteristic from the host to the protection target volume. The calculation program 5240 obtains a value based on the maximum value of the update access characteristic during the monitor period by use of the update request access characteristic during the monitor period managed by the access characteristic monitor program 5400 and then sets the obtained value as the selection condition of the update access characteristic of update request storage volume.

Figure 15:
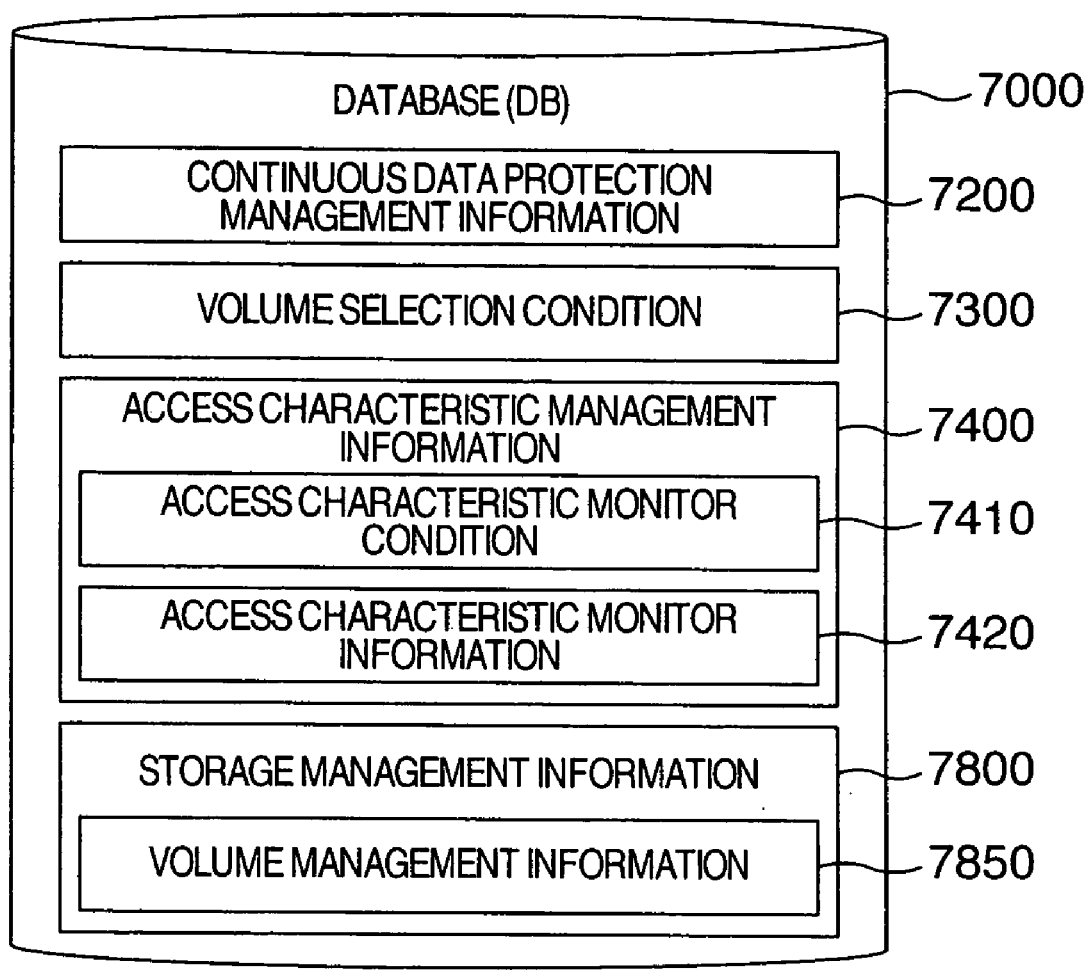
FIG. 15 is a block diagram showing details of a database in the second embodiment.

The access characteristic monitor program 5400 includes a monitor condition input program 5410 and an update access characteristic monitor program 5420. The input program 5410 presents an access characteristic monitor condition input screen 8500 (FIG. 18) to receive an input of the access characteristic monitor condition for the volume. The inputted value is stored in the access characteristic monitor condition 7410 (FIG. 15). According to the monitor condition of the monitor condition 7410, the monitor program 5420 instructs the disk controller 2500 to monitor the access characteristic of the monitor target volume. Specifically, the monitor program 5420 instructs the disk controller 2500 to measure, as the access characteristic of the monitor target volume, the amount of data of the update request per unitary time. FIGS. 15 to 19 will be described later.

For the designated monitor period, the monitor program 5420 obtains the update access characteristic of the monitor target volume from the disk controller 2500 and stores the update access characteristic in the access characteristic monitor information 7420 (FIG. 15). If the monitor operation is completed for the designated monitor period, the monitor program 5420 finishes the access characteristic monitor operation for the volume, updates the monitor state to "monitor completed" in the monitor condition 7410 (FIG. 15), and then requests the disk controller 2500 to terminate the measurement of the update access characteristic of the volume.

The update access characteristic monitor program 5420 also presents an access characteristic monitor state confirmation screen 8600 (FIG. 19) to the user for confirmation of the access characteristic monitor state of the monitor target volume. If the user designates a volume and selects "monitor termination", the access characteristic monitor operation is finished for the volume and the information regarding the volume is deleted from the access characteristic monitor condition 7410. In the second embodiment, the database 7000 also stores data required for the access characteristic management by the monitor program 5400.

FIG. 15 is a block diagram showing details of the database in the second embodiment. The database 7000 includes access characteristic management information 7400 managed by the access characteristic monitor program 5400 (FIG. 14) in addition to the continuous data protection management information 7200 managed by the continuous data protection program 5100 (FIG. 14), the volume selection condition 7300, and the storage management information 7800 associated with the storage management system 6000. The data management information 7200, the selection condition 7300, and the storage management information 7800 are equivalent to those of the first embodiment, and hence description thereof will be avoided.

The access characteristic management information 7400 includes an access characteristic monitor condition 7410 and access characteristic monitor information 7420. The monitor condition 7410 stores therein, for example, a condition to monitor a monitor target volume. The monitor information 7420 stores therein information regarding the access characteristic obtained by monitoring the monitor target volume.

FIG. 16 is an explanatory diagram showing an example of the access characteristic monitor condition. The access characteristic monitor condition 7410 managed by the monitor program 5400 (FIG. 14) includes, as attributes to manage the monitoring of the update access characteristic, a logical ID, a storage system ID, a monitor period, and a monitor state. The logical ID is an identifier to uniquely identify the volume in a storage system to which the monitor target volumes belong. The storage system ID is an identifier to represent a storage system to which the monitor target volumes belong. The monitor period indicates a monitor period designated by the user, for example, in seconds. The monitor state indicates whether or not the update access characteristic monitor is in operation or has been completed, and includes a character string such as "being monitored" or "monitor completed".

FIG. 17 is an explanatory diagram showing an example of the access characteristic monitor information. The access characteristic monitor information 7420 managed by the monitor program 5400 (FIG. 14) includes, as attributes regarding the update access characteristic, a logical ID, a storage system ID, a point of time, and an update access characteristic. The logical ID is an identifier to uniquely identify the volume in a storage system to which the monitor target volumes belong. The storage system ID is an identifier to represent a storage system to which the monitor target volumes belong. The point of time indicates a point of time when the access characteristic of the monitor target volume is monitored. The update access characteristic indicates an update access characteristic for the monitor target volume measured by the disk controller 2500 and is expressed in units of, for example, MBps.

FIG. 18 is an explanatory diagram showing an example of the access characteristic monitor condition input screen. The input screen 8500 presented by the monitor condition input program 5410 (FIG. 14) to the user includes a monitor target volume information display area 8510 to display information regarding the target volume and a monitor condition input area 8520 for the user to input a monitor condition. The information display area 8510 includes a logical ID and a storage system ID. The logical ID is an identifier to uniquely identify a volume in a storage system to which the volume belongs. The storage system ID is an identifier to represent a storage system to which the volume belongs. The condition input area 8520 includes a monitor period input area for the target volume and receives an input of data in units of, for example, seconds.

By designating the monitor period to include a time zone in which the number of requests for update accesses from applications and hosts using the volume takes a maximum value, it is possible to obtain the maximum value and the mean value of the update access characteristic for the volume. For example, "one week" is specified for an application having the peak at weekend. For an application operating uniformly irrespective of time zones, the value of the continuous data protection period is specified.

FIG. 19 is an explanatory diagram showing an example of the access characteristic monitor state confirmation screen. The confirmation screen 8600 presented by the update access characteristic monitor program 5420 (FIG. 14) to the user includes an access characteristic monitor state confirmation area 8610. The confirmation area 8610 includes a logical ID, a storage system ID, a monitor period, and a monitor state to display information items respectively stored in the associated fields of the access characteristic monitor information 7420. The information items are equivalent to those of the monitor information 7420 and hence description thereof will be avoided.

FIG. 20 is an explanatory diagram showing an example of the candidate volume selection confirmation screen in the second embodiment. The confirmation screen 8700 presented by the selection condition calculation program 5200 (FIG. 14) includes a continuous data protection application state display area 8710 and a candidate volume selection condition display area 8720 to display a candidate volume selection condition for the user to confirm the condition. The display area 8710 includes a continuous data protection target volume information display area 8711 to display information regarding the protection target volume for continuous data protection, a continuous data protection period display area 8712, a copy data storage volume information display area 8713 to display information regarding the copy data storage volume to which the continuous data protection is being applied, and an update request storage volume information display area 8714 to display information regarding the update request storage volume to which the continuous data protection is being applied. These information items have already been described, and hence duplicated description thereof will be avoided.

FIG. 21 is an explanatory diagram showing an example of the candidate volume decision screen in the second embodiment. The decision screen 8800 presented by the candidate volume decision program 5320 (FIG. 14) to the user includes a continuous data protection application state display area 8810 to display an application state of the continuous data protection and a candidate volume list area 8820. The list area 8820 includes a copy data storage volume candidate list 8821 and an update request storage volume candidate list 8822. The items in the respective display areas have already been described, and hence duplicated description thereof will be avoided.

The candidate volume decision program 5320 (FIG. 14) presents the candidate volume decision screen 8800 to the user. The user compares information regarding the copy data and update request storage volumes in use for the application of the continuous data protection to the protection target volume displayed in the continuous data protection application state display area with information displayed in the copy data and update request storage volume candidate lists to uniquely determine a copy data storage volume and an update request storage volume.

Figure 22:
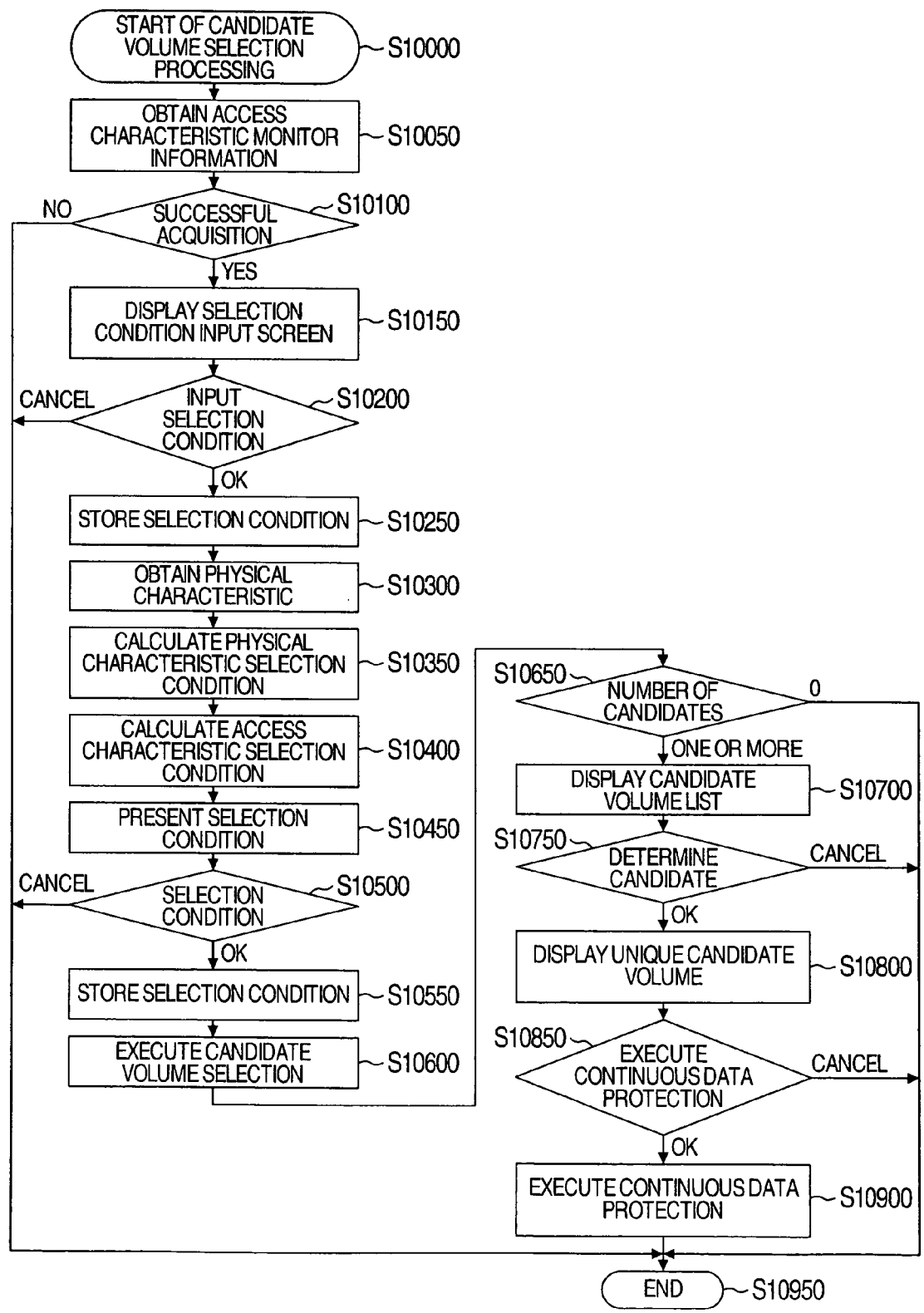
FIG. 22 is a flowchart showing candidate volume selection processing in the second embodiment.

FIG. 22 is a flowchart showing candidate volume selection processing in the second embodiment. In the processing of FIG. 22, it is requested to execute the continuous data protection, using a new copy data storage volume and a new update request storage volume, for a protection target volume to which the continuous data protection is being applied. Description will be given of processing to select, by use of the update access characteristic for the protection target, the copy data and update request storage volume candidates to continuously protect data in the protection target volume.

The processing shown in FIG. 22 is started, for example, when the user designates a protection target volume to which the continuous data protection is being applied to thereby request retrieval of the copy data and update request storage volume candidates. Each program is executed by the CPU 4100. Description will be given of the processing by referring to FIGS. 14 to 21 according to necessity.

After the access characteristic selection condition calculation program 5240 is started, the candidate volume selection processing starts its operation (step S10000). The access characteristic monitor information of the protection target volume is obtained from the access characteristic monitor information 7420 (step S10050). The calculation program 5240 determines whether or not the monitor information has been obtained (step S10100). If the acquisition of the monitor information fails (no in step S10100), the processing is terminated (step S10950). If the acquisition is successfully finished (yes in step S10100), control goes to the next processing.

The selection condition input program 5210 displays the candidate volume selection condition input screen 8100 (step S10150) to request the user to input a continuous data protection period. The input program 5210 checks the input of the selection condition (step S10200). If cancel is selected (cancel in step S10200), the processing is terminated (step S10950). If the protection period is inputted and OK is selected (OK in step S10200), control goes to the next processing.

The selection condition input program 5210 notifies the selection condition management program 5230 of the designated protection target volume and the inputted continuous data protection period. The selection condition management program 5230 stores the protection target volume and the continuous data protection period in the volume selection condition 7300 (step S10250).

The physical characteristic selection condition calculation program 5220 obtains the physical characteristic of the designated protection target volume from the volume management information 7850 (step S10300). The calculation program 5220 calculates, according to the obtained physical characteristic of the target volume, a selection condition of the disk capacity of the copy data storage volume (step S10350). The access characteristic selection condition calculation program 5240 calculate, using the obtained access characteristic monitor information of the target volume, a selection condition of the update access characteristic of the copy data storage volume, a selection condition of the update access characteristic of the update request storage volume, and a selection condition of the disk capacity of the update request storage volume (step S10400) and stores the selection conditions in the volume selection condition 7300. The selection condition calculation program 5200 presents the candidate volume selection condition confirmation screen 8700 (FIG. 20) to urge the user to confirm the selection conditions of the candidate volumes (step S10450).

The selection condition calculation program 5200 determines whether or not an input of a selection condition is present (step S10500). If cancel is selected in FIG. 20 (cancel in step S10500), the processing is terminated (step S10950). If OK is selected in FIG. 20 (OK step S10500), control goes to the next processing.

The calculation program 5200 notifies the candidate volume selection conditions to the selection condition management program 5230. The management program 5230 stores the conditions in the volume selection condition 7300 (step S10550). On the basis of the selection conditions stored in the volume selection condition 7300, the candidate volume selection program 5310 selects candidate volumes for the copy data and update request storage volumes (step S10600). The selection program 5310 determines the number of candidate volumes thus selected (step S10650). If the number of candidate volumes for either one of the volume types is zero (zero in step S10650), the processing is terminated (step S10950). If the number of candidate volumes for each volume type is one or more (one or more in step S10650), control goes to the next processing.

The candidate volume decision program 5320 displays the candidate volume decision screen 8800 (FIG. 21; step S10700) to request the user to uniquely determine the copy data and update request storage volumes. The decision program 5320 determines whether or not the candidates have been determined (step S10750). If cancel is selected in FIG. 21 (cancel in step S10750), the processing is terminated. If the candidates are uniquely determined respectively for the copy data and update request storage volumes and OK is selected in FIG. 21 (OK in step S10750), control goes to the next processing.

The decision program 5320 displays the continuous data protection application confirmation screen 8400 (FIG. 10; step S10800) to request the user to confirm that the continuous data protection is applied to the protection target volume by using the uniquely determined copy data and update request storage volumes. The decision program 5320 determines whether or not the continuous data protection has been conducted (step S10850). If cancel is selected for the execution of the continuous data protection (cancel in step S10850), the processing is terminated (step S10950). If OK is selected for the execution of the continuous data protection (OK in step S10850), control goes to the next processing.

The candidate volume decision program 5320 requests the continuous data protection program 5100 to continuously protect data in the protection target volume using the uniquely determined copy data and update request storage volumes (step S10900) to thereby terminate the processing (step S10950).

In the second embodiment, if the access characteristic monitor information acquisition for the protection target volume by the access characteristic selection condition calculation program 5240 (step S10050) fails, the processing is terminated (step S10950). It is also possible in the failure in the access characteristic monitor information acquisition that the calculation of the access characteristic selection condition (step S10400) is skipped to select candidate volumes by using the selection conditions calculated according to the physical characteristic selection condition.

In this situation, according to the physical characteristic of the protection target volume, the physical characteristic selection condition calculation program 5220 calculates, in addition to the selection condition of the disk capacity of the copy data storage volume, a selection condition of the update access characteristic of the copy data storage volume, a selection condition of the update access characteristic of the update request storage volume, and a selection condition of the disk capacity of the update request storage volume (step S10350).

The processing shown in FIG. 22 is also started, for example, when the user designates a protection target volume which is in use and to which the continuous data protection is not being applied, to thereby request retrieval of candidates for the copy data and update request storage volumes (step S10000). In this situation, the selection condition calculation program 5200 displays the candidate volume selection condition confirmation screen 8200 (FIG. 8) for the user to confirm the selection conditions for the candidate volumes. Also, the candidate volume decision program 5320 displays the candidate volume decision screen 8300 (FIG. 9) for the user to uniquely determine the candidates for the copy data and update request storage volumes. The other processing is as described above, namely, is not changed.

According to an aspect of the second embodiment, the storage management server 4000 monitors the update access from the host to the protection target volume. On the basis of the continuous data protection period T (CDP; FIG. 11) which is a period in which the data of the protection target volume 2210 is continuously protected, the disk capacity of the protection target volume, and the update access characteristic in a predetermined monitor period of the protection target volume, the server 4000 calculates the selection conditions of the candidates for the copy data storage volume 2320 and the update request storage volume 2310, and then selects the candidates for the volumes 2320 and 2310 according to the selection conditions.

According to another aspect of the second embodiment, the selection conditions are as follows. The disk capacity of the protection target volume 2210 is set as that of the copy data storage volume 2320 and the mean value of the update access characteristic of the protection target volume 2210 is set as the update access characteristic of the copy data storage volume 2320. The disk capacity obtained by adding the first disk capacity obtained by multiplying the mean value of the access characteristic of the protection target volume 2210 by the continuous data protection period T(CDP) to the second disk capacity obtained by accumulating, at occurrence of the update access exceeding the mean value of the update access characteristic of the protection target volume 2210, the excessive update access is set as the disk capacity of the update request storage volume 2310. The maximum value of the update access characteristic of the protection target volume 2210 is set as the update access characteristic of the update request storage volume 2310. According to the configuration, at application of the continuous data protection, the copy data storage volume 2320 and the update request storage volume 2310 can be easily selected.

According to the second embodiment, even if an abnormality occurs in data of the protection target volume 2210, the continuous data protection system is capable of restoring data to a particular position (point of time) within the continuous data protection period T(CDP).

Third Embodiment

In the third embodiment, the user selects a combination of a copy data storage volume candidate and an update request storage volume candidate to uniquely determine volumes to be used for the continuous data protection. Description will be given of modes of the third embodiment by referring to the explanatory diagrams and the processing flows used to explain the second embodiment.

In the third embodiment, the access characteristic selection condition calculation program 5240 calculates the update request storage disk capacity using the update access characteristic of a designated volume and the access characteristic monitor information 7420 managed by the update access characteristic monitor program 5420. Specifically, the calculation program 5240 obtains the physical characteristic of the designated volume from the volume management information 7850 and the update characteristic of the protection target volume from the access characteristic monitor information 7420. By accumulating, at occurrence of the update access of the protection target volume exceeding the update access characteristic of the physical characteristic of the designated volume 2210, the amount of data of the excessive update access characteristic, the update request storage buffer capacity of the update request storage volume is calculated. Using the update request storage capacity and the update request storage buffer capacity calculated in the method described in conjunction with the second embodiment, the selection condition of the disk capacity of the update request storage volume is calculated.

FIG. 23 is an explanatory diagram showing an example of the candidate volume decision screen in the third embodiment. The candidate volume decision screen 8830 differs from the candidate volume decision screen 8800 (FIG. 21) of the second embodiment in that the copy data storage volume candidate list and the update request storage volume candidate list of the second embodiment are combined with each other into a combination candidate list. Information items of the other areas and the combination candidate list are equivalent to those of the candidate volume decision screen 8800 and hence description thereof will be avoided. The candidate volume decision program 5320 displays the decision screen 8830 to request the user to uniquely determine a combination candidate volume using the list of combinations of the copy data and update request storage volumes.

Figure 24:
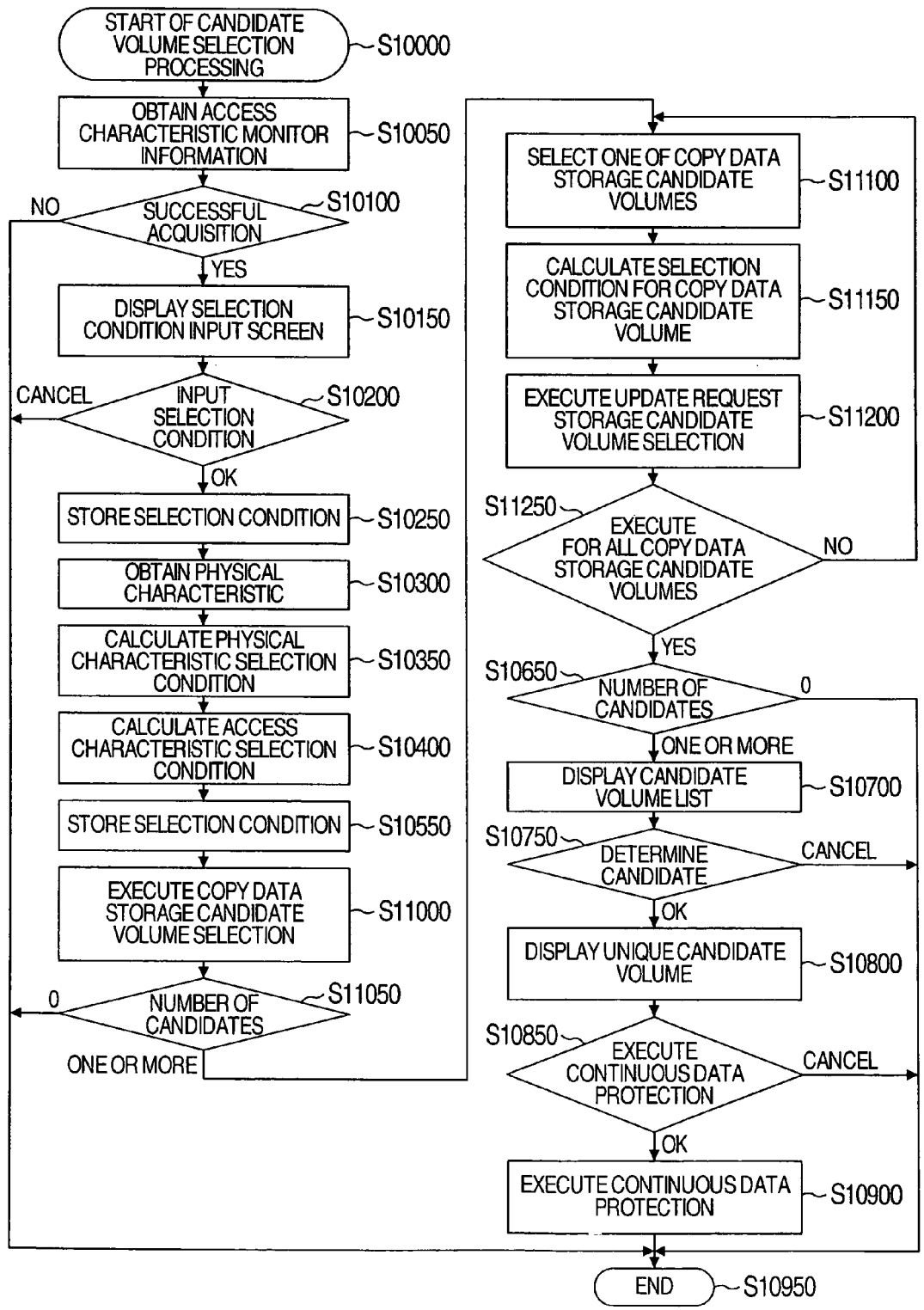
FIG. 24 is a flowchart showing candidate volume selection processing in the third embodiment.

FIG. 24 is a flowchart showing candidate volume selection processing in the third embodiment. In FIG. 24, there is shown processing to select combination candidates for the copy data and update request storage volumes. That is, in the processing, from the combination candidates for the copy data and update request storage volumes, a combination candidate of a copy data storage volume and an update request storage volume is selected and is uniquely determined, and then the execution of the continuous data protection is requested. In FIG. 24, the same processing steps as those of FIG. 22 are assigned with the same reference numerals, and hence description thereof will be avoided. When FIG. 24 is compared with FIG. 22, it is determined that steps S10000 to S10400, step S10550, and steps S10650 to S10950 are used in both processing flows.

After the processing of step S10400, the selection condition calculation program 5200 notifies the candidate volume selection condition to the selection condition management program 5230. The management program 5230 stores the selection condition in the volume selection condition 7300 (step S10550).

The candidate volume selection program 5310 selects first a candidate volume for the copy data storage volume according to the candidate volume selection condition stored in the volume selection condition 7300 (step S11000). The selection program 5310 determines the number of selected candidates (step S11050). If the number of selected candidates is zero (0 in step S11050), the processing is terminated (step S10950). If the number of selected candidates is one or more (one or more in step S11050), control goes to the next processing.

The selection program 5310 selects one of the candidate volumes for the copy data storage volume (step S11100) and requests the access characteristic selection condition calculation program 5240 to calculate a selection condition of the disk capacity of the update request storage volume to thereby obtain the selection condition (step S11150). Next, according to the selection condition of the update access characteristic of the update request storage volume stored in the volume selection condition 7300, the program 5310 executes selection of candidates for the update request storage volume (step S11200). The program determines whether or not the selection has been executed for all candidate volumes of the copy data storage volumes (step S11250). If the candidate selection has not been conducted for all copy data storage volumes (no in step S11250), control returns to step S11100. If the candidate selection has been conducted for all copy data storage volumes (yes in step S11250), control goes to the next step.

The candidate volume selection program 5310 determines the number (combination candidate number) of the combination candidates of the copy data and update request storage volumes thus selected (step S10650). If the number of combination candidates is zero (0 in step S10650), the processing is terminated (step S10950). If the number is one or more (one or more in step S10650), the candidate volume decision program 5320 displays the candidate volume decision screen 8830 (FIG. 23) to request the user to uniquely determine the candidates respectively for the copy data and update request storage volumes.

Fourth Embodiment

In the fourth embodiment, the system urges the user to designate a degree of margin for the candidate volume selection condition such that the candidate volume selection program selects candidate volumes by adding a degree of access characteristic margin to the selection condition calculated by the selection condition calculation program. The candidate volume decision program displays the candidate volumes together with the degree of access characteristic margin to each candidate volume selection condition. It enables the user to determine associated volumes in consideration of the degree of margin of the selection condition.

Description will be given of modes of the fourth embodiment by referring to the explanatory diagrams and the processing flows used to explain the second embodiment. The volume selection condition 7300 (FIGS. 5 and 15) of the fourth embodiment includes a degree of access characteristic margin as an attribute to manage the volume selection condition.

The candidate volume selection condition input screen of the fourth embodiment includes an access characteristic margin degree input area in the candidate volume selection condition input area. The access characteristic margin degree input area is an area for the user to input a degree of margin to make the volume selection program 5300 select candidate volumes having a margin for the selection condition of the update access characteristic of the candidate volumes calculated by the selection condition calculation program 5200. The degree of margin is received in units of, for example, percent (%). The candidate volume selection condition confirmation screen of the fourth embodiment includes an access characteristic margin degree display area in the candidate volume selection condition display area.

The candidate volume decision screen of the fourth embodiment includes an access characteristic margin degree for the selection condition of the update access characteristic in each of the copy data storage volume candidate list and the update request storage volume candidate list.

Description will be given of the operation by referring to the processing flow shown in FIG. 22. In the fourth embodiment, the selection condition input program 5210 presents in step S10150 the candidate volume selection condition input screen to urge the user to input a continuous data protection period and an access characteristic margin degree. The selection condition calculation program 5200 displays in step S10450 the access characteristic margin degree together with the candidate volume selection condition input screen. In step S10550, the selection condition management program 5230 stores the candidate volume selection condition together with the access characteristic margin degree in the volume selection condition 7300. In step S10600, the candidate volume selection program 5310 selects, using the update access characteristic satisfying the access characteristic margin degree for the update access characteristic stored in the volume selection condition 7300 as the volume selection condition, candidates for the copy data and update request storage volumes. In step S10700, the candidate volume decision program 5320 displays the candidate volume decision screen together with the update access characteristic margin degree calculated for the update access characteristic selection condition for each candidate volume.

Fifth Embodiment

In the fifth embodiment, when the user inputs the cost of the volume per unitary volume capacity as the selection condition of the candidate volume, the system selects candidate volumes in consideration of the cost. By displaying the cost of each of the protection target volume, the copy data and update request storage volumes being used at application of the continuous data protection to the protection target volume, the copy data and update request storage volumes selected by the candidate volume selection program, the user can determine the volumes in consideration of the cost.

Description will be given of modes of the fifth embodiment by referring to the explanatory diagrams and the processing flows used to explain the second embodiment. The volume management information 8750 of the fifth embodiment includes the cost of volume per unitary capacity as an attribute of the volume. The attribute is managed, for example, using the amount per GigaBit (GB), specifically, ¥/GB. The candidate volume selection program compares the condition regarding the cost contained in the volume selection condition with the cost in the volume management information 7850 to thereby select volumes satisfying the cost condition.

The volume selection condition 7300 of the fifth embodiment includes, as attributes to manage the selection condition, an upper-limit cost of the copy data storage volume and an upper-limit cost of the update request storage volume.

The candidate volume selection condition input screen of the fifth embodiment includes, in the candidate volume selection condition input area, a copy data storage volume upper-limit cost input area and an update request storage volume upper-limit cost input area. The candidate volume selection condition confirmation screen of the fifth embodiment includes, in the candidate volume selection condition display area, a copy data storage volume upper-limit cost display area and an update request storage volume upper-limit cost display area.

The candidate volume decision screen of the fifth embodiment includes a volume cost display area for each of the copy data and update request storage volume candidate lists.

Description will be given of the operation by referring to the processing flow shown in FIG. 22. According to the fifth embodiment, the selection condition input program 5210 presents, in step S10150, the candidate volume selection condition input screen to urge the user to input the continuous data protection period, the copy data storage volume upper-limit cost, and the update request storage volume upper-limit cost. In step S10250, the selection condition management program 5230 stores the protection target volume, the continuous data protection period, the copy data storage volume upper-limit cost, and the update request storage volume upper-limit cost in the volume selection condition 7300. In step S10450, the selection condition calculation program 5200 displays the candidate volume selection condition confirmation screen together with the copy data storage volume upper-limit cost and the update request storage volume upper-limit cost stored in the volume selection condition 7300.

In step S10550, the selection condition management program 5230 stores the candidate volume selection condition together with the copy data storage volume upper-limit cost and the update request storage volume upper-limit cost in the volume selection condition 7300. In step S10600, the candidate volume selection program 5310 obtains from the volume selection condition 7300 the selection conditions of the update access characteristic and the disk capacity as well as the selection conditions of the copy data storage volume upper-limit cost and the update request storage volume upper-limit cost to thereby select candidates for the copy data and update request storage volumes satisfying the obtained selection conditions. In step S10700, at presentation of the candidate volume decision screen, the candidate volume decision program 5320 obtains the cost from the volume management information 7850 for each candidate volume to also display the cost.

The candidate volume selection condition input screen may include a cost input area to input the total of the cost of the candidates for the copy data and update request storage volumes.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A continuous data protection method of continuously protecting data stored in a protection target volume of a storage by use of a copy data storage volume to store therein copy data created by copying the data and an update request storage volume to store therein an update request from a host to the protection target volume, comprising the step, conducted by a management server to manage the storage, of:
    calculating a selection condition of a candidate for the copy data storage volume and a selection condition of a candidate for the update request storage volume on the basis of a continuous data protection period in which the data of the protection target volume is continuously protected and a disk capacity and an update access characteristic of the protection target volume; and
    selecting candidates for the copy data storage volume and candidates for the update request storage volume; and
    a step of setting the selection conditions, the step comprising:
    setting a value based on the disk capacity of the protection target volume as a disk capacity of the copy data storage volume;
    setting a value based on an upper-limit value of the update access characteristic of the protection target volume as an update access characteristic of the copy data storage volume;
    setting a value based on a product between the upper-limit value of the update access characteristic of the protection target volume and the continuous data protection period as a disk capacity of the update request storage volume; and
    a value based on the upper-limit value of the update access characteristic of the protection target volume as an update access characteristic of the update request storage volume.

2. A continuous data protection method of continuously protecting data stored in a protection target volume of a storage by use of a copy data storage volume to store therein copy data created by copying the data and an update request storage volume to store therein an update request from a host to the protection target volume, comprising the step, conducted by a management server to manage the storage, of:
    monitoring an update access from the host to the protection target volume;
    calculating a selection condition of a candidate for the copy data storage volume and a selection condition of a candidate for the update request storage volume on the basis of a continuous data protection period which is a period in which the data of the protection target volume is continuously protected and a disk capacity and an update access characteristic during a predetermined period of the monitoring of the protection target volume; and selecting, according to the selection conditions thus calculated, candidates for the copy data storage volume and candidates for the update request storage volume;

a step of setting the selection conditions, the step comprising:

setting a value based on the disk capacity of the protection target volume as a disk capacity of the copy data storage volume;

setting a value based on a mean value of the update access characteristic of the protection target volume as an update access characteristic of the copy data storage volume;

setting, as a disk capacity of the update request storage volume, a value based on a value obtained by adding a first disk volume which is a product between the mean value of the update access characteristic of the protection target volume and the continuous data protection period to a second disk volume obtained by accumulating, at occurrence of an update access exceeding the mean value of the update access characteristic of the protection target volume, the update access as the excessive update access for the continuous data protection period; and setting a value based on a maximum value of the update access characteristic of the protection target volume as an update access characteristic of the update request storage volume.

3. A continuous data protection system comprising a management server for managing a storage, the server continuously protecting data stored in a protection target volume of a storage by use of a copy data storage volume to store therein copy data created by copying the data and an update request storage volume to store therein an update request from a host to the protection target volume, the management server comprising:

an input module for receiving as an input thereto a continuous data protection period in which the data of the protection target volume is continuously protected, a calculation module for calculating a selection condition of a candidate for the copy data storage volume and a selection condition of a candidate for the update request storage volume on the basis of a continuous data protection period inputted from the input module and a disk capacity and an update access characteristic of the protection target volume; and a selection module for selecting candidates for the copy data storage volume and candidates for the update request storage volume according to the selection conditions calculated by the calculation module, wherein the calculation module sets the selection conditions by:

setting a value based on the disk capacity of the protection target volume as a disk capacity of the copy data storage volume;

setting a value based on an upper-limit value of the update access characteristic of the protection target volume as an update access characteristic of the copy data storage volume;

setting a value based on a product between the upper-limit value of the update access characteristic of the protection target volume and the continuous data protection period as a disk capacity of the update request storage volume; and a value based on the upper-limit value of the update access characteristic of the protection target volume as an update access characteristic of the update request storage volume.

4. A continuous data protection system comprising a management server for managing a storage, the server continuously protecting data stored in a protection target volume of a storage by use of a copy data storage volume to store therein copy data created by copying the data and an update request storage volume to store therein an update request from a host to the protection target volume, the management server comprising:

a monitor period input module for receiving as an input thereto a monitor period in which an update access from a host to the protection target volume is monitored;

a monitor module for monitoring an update access from the host to the protection target volume during the monitor period inputted from the monitor period input module;

an input module for receiving as an input thereto a continuous data protection period in which the data of the protection target volume is continuously protected;

a calculation module for calculating a selection condition of a candidate for the copy data storage volume and a selection condition of a candidate for the update request storage volume on the basis of the continuous data protection period, a disk capacity of the protection target volume, and the update access characteristic monitored by the monitor module of the protection target volume; and a selection module for selecting candidates for the copy data storage volume and candidates for the update request storage volume according to the selection conditions calculated by the calculation module, wherein the calculation module calculates a maximum value and a mean value of the update access characteristic during the monitor period by use of the update access characteristic of the protection volume during the monitor period.

5. A continuous data protection system comprising a management server for managing a storage, the server continuously protecting data stored in a protection target volume of a storage by use of a copy data storage volume to store therein copy data created by copying the data and an update request storage volume to store therein an update request from a host to the protection target volume, the management server comprising:

a monitor period input module for receiving as an input thereto a monitor period in which an update access from a host to the protection target volume is monitored;

a monitor module for monitoring an update access from the host to the protection target volume during the monitor period inputted from the monitor period input module;

an input module for receiving as an input thereto a continuous data protection period in which the data of the protection target volume is continuously protected;

a calculation module for calculating a selection condition of a candidate for the copy data storage volume and a selection condition of a candidate for the update request storage volume on the basis of the continuous data protection period, a disk capacity of the protection target volume, and the update access characteristic monitored by the monitor module of the protection target volume; and a selection module for selecting candidates for the copy data storage volume and candidates for the update request storage volume according to the selection conditions calculated by the calculation module, wherein the calculation module sets the selection conditions by;

setting a value based on a mean value of the update access characteristic of the protection target volume during the monitor period as an update access characteristic of the copy data storage volume;

setting a value based on the disk capacity of the protection target volume as a disk capacity of the copy data storage volume;

setting a value based on a maximum value of the update access characteristic of the protection target volume during the monitor period as an update access characteristic of the update request storage volume; and setting, as a disk capacity of the update request storage volume, a value based on a disk capacity obtained by adding a first disk capacity which is a product between the mean value of the update access characteristic of the protection target volume during the monitor period and the continuous data protection period to a second disk capacity obtained by accumulating, at occurrence of an update access exceeding the mean value of the update access characteristic of the protection target volume, the update access as the excessive update access for the continuous data protection period.

6. A continuous data protection system comprising a management server for managing a storage, the server continuously protecting data stored in a protection target volume of a storage by use of a copy data storage volume to store therein copy data created by copying the data and an update request storage volume to store therein an update request from a host to the protection target volume, the management server comprising:

a monitor period input module for receiving as an input thereto a monitor period in which an update access from a host to the protection target volume is monitored;

a monitor module for monitoring an update access from the host to the protection target volume during the monitor period inputted from the monitor period input module;

an input module for receiving as an input thereto a continuous data protection period in which the data of the protection target volume is continuously protected;

a calculation module for calculating a selection condition of a candidate for the copy data storage volume and a selection condition of a candidate for the update request storage volume on the basis of the continuous data protection period, a disk capacity of the protection target volume, and the update access characteristic monitored by the monitor module of the protection target volume; and a selection module for selecting candidates for the copy data storage volume and candidates for the update request storage volume according to the selection conditions calculated by the calculation module, wherein:

the management server comprises a display module;

the input module receives, when the selection module selects candidates for the copy data and candidates for the update request storage volumes, an input of a margin degree of the update access characteristic for the selection conditions; and the selection module selects a candidate volume satisfying the margin degree for the selection conditions and displays, when displaying the candidate volume thus selected, the margin degree of the candidate volume.

7. A continuous data protection system comprising a management server for managing a storage, the server continuously protecting data stored in a protection target volume of a storage by use of a copy data storage volume to store therein copy data created by copying the data and an update request storage volume to store therein an update request from a host to the protection target volume, the management server comprising:

a monitor period input module for receiving as an input thereto a monitor period in which an update access from a host to the protection target volume is monitored;

a monitor module for monitoring an update access from the host to the protection target volume during the monitor period inputted from the monitor period input module;

an input module for receiving as an input thereto a continuous data protection period in which the data of the protection target volume is continuously protected;

a calculation module for calculating a selection condition of a candidate for the copy data storage volume and a selection condition of a candidate for the update request storage volume on the basis of the continuous data protection period, a disk capacity of the protection target volume, and the update access characteristic monitored by the monitor module of the protection target volume; and a selection module for selecting candidates for the copy data storage volume and candidates for the update request storage volume according to the selection conditions calculated by the calculation module, wherein:

the management server comprises a display module;

the input module receives an input of a cost per unitary capacity of a volume; and the selection module selects a candidate volume satisfying the cost for the selection conditions and displays, when displaying the candidate volume thus selected, the cost of the candidate volume.

8. A continuous data protection system according to claim 7, wherein the selection module displays, on the display module, a cost of the copy data storage module and a cost of the update request storage volume designated for the protection target volume to which the continuous data protection is being applied.

* * * * *